United States Patent [19]

Birney et al.

[11] 4,050,060
[45] Sept. 20, 1977

[54] EQUATE OPERAND ADDRESS SPACE CONTROL SYSTEM

[75] Inventors: Richard Eugene Birney; Robert Allen Hood, both of Boca Raton, Fla.

[73] Assignee: International Business Machines Corporation, Armonk, N.Y.

[21] Appl. No.: 682,221

[22] Filed: Apr. 30, 1976

[51] Int. Cl.$^2$ .............................................. G06F 9/20
[52] U.S. Cl. .................................................. 364/200
[58] Field of Search ........................ 340/172.5; 445/1

[56] References Cited

U.S. PATENT DOCUMENTS

| | | | |
|---|---|---|---|
| 3,581,291 | 5/1971 | Iwamoto et al. | 340/172.5 |
| 3,651,483 | 3/1972 | Clark et al. | 340/172.5 |
| 3,716,840 | 2/1973 | Masten et al. | 340/172.5 |
| 3,771,136 | 11/1973 | Heneghan et al. | 340/172.5 |

Primary Examiner—Mark E. Nusbaum
Attorney, Agent, or Firm—Bernard M. Goldman

[57] ABSTRACT

The disclosure describes equate operand spaces (EOS) control over the addressabilities accessed by means of different address keys in an address key register (AKR) in a processor. Executing instructions, and their source and sink type operands may have different address keys in the AKR, and therefore different addressabilities. When enabled, the EOS control forces each source operand fetch to occur within the sink operand addressability specified in the AKR, even though the AKR explicitly contains a different addressability for source operands. When the EOS feature is disabled, the source operand addressability contained in the AKR is used when fetching source operands. An EOS field in the AKR stores whether the EOS state is enabled or disabled in the processor.

6 Claims, 37 Drawing Figures (ACTIVE KEY SELECTOR)

(ADDRESS-KEY CONTROLLED TRANSLATOR)

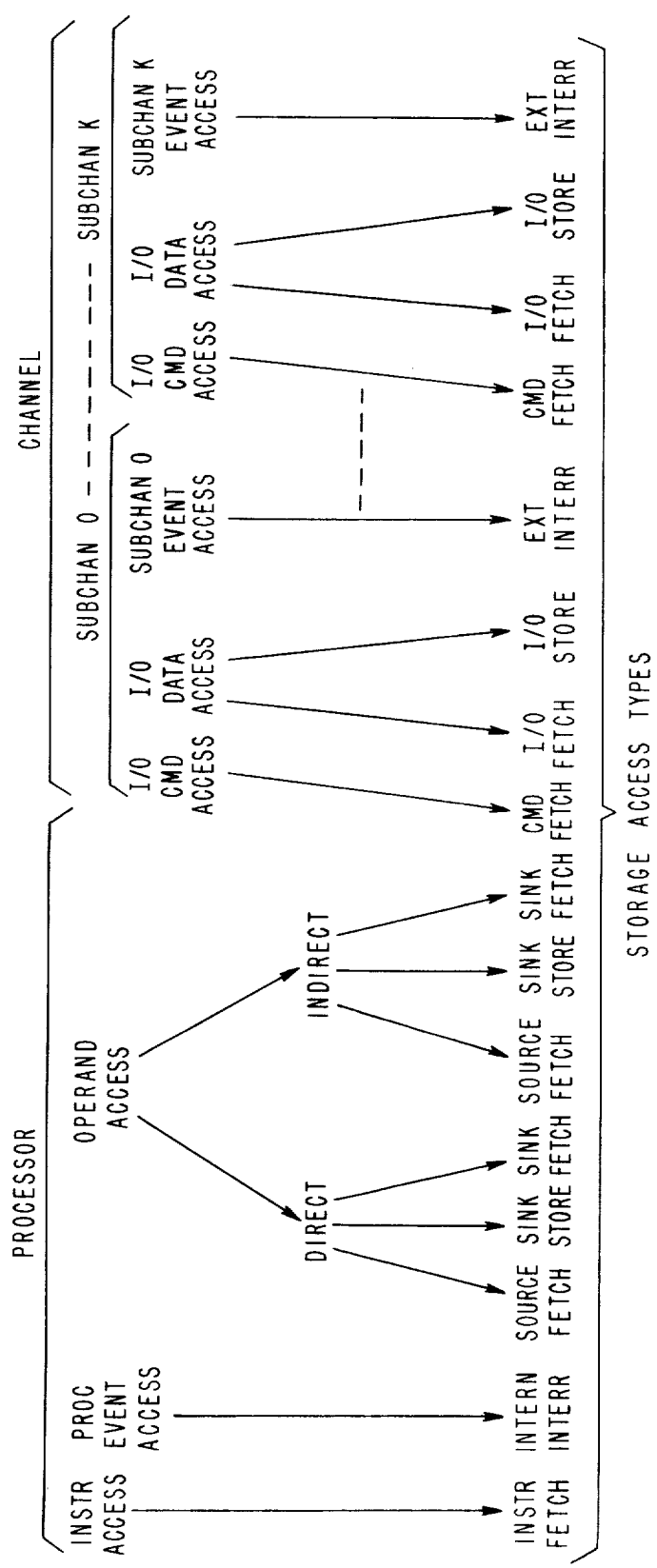
FIG. 1B (MACHINE-IDENTIFIABLE STORAGE ACCESS TYPES)

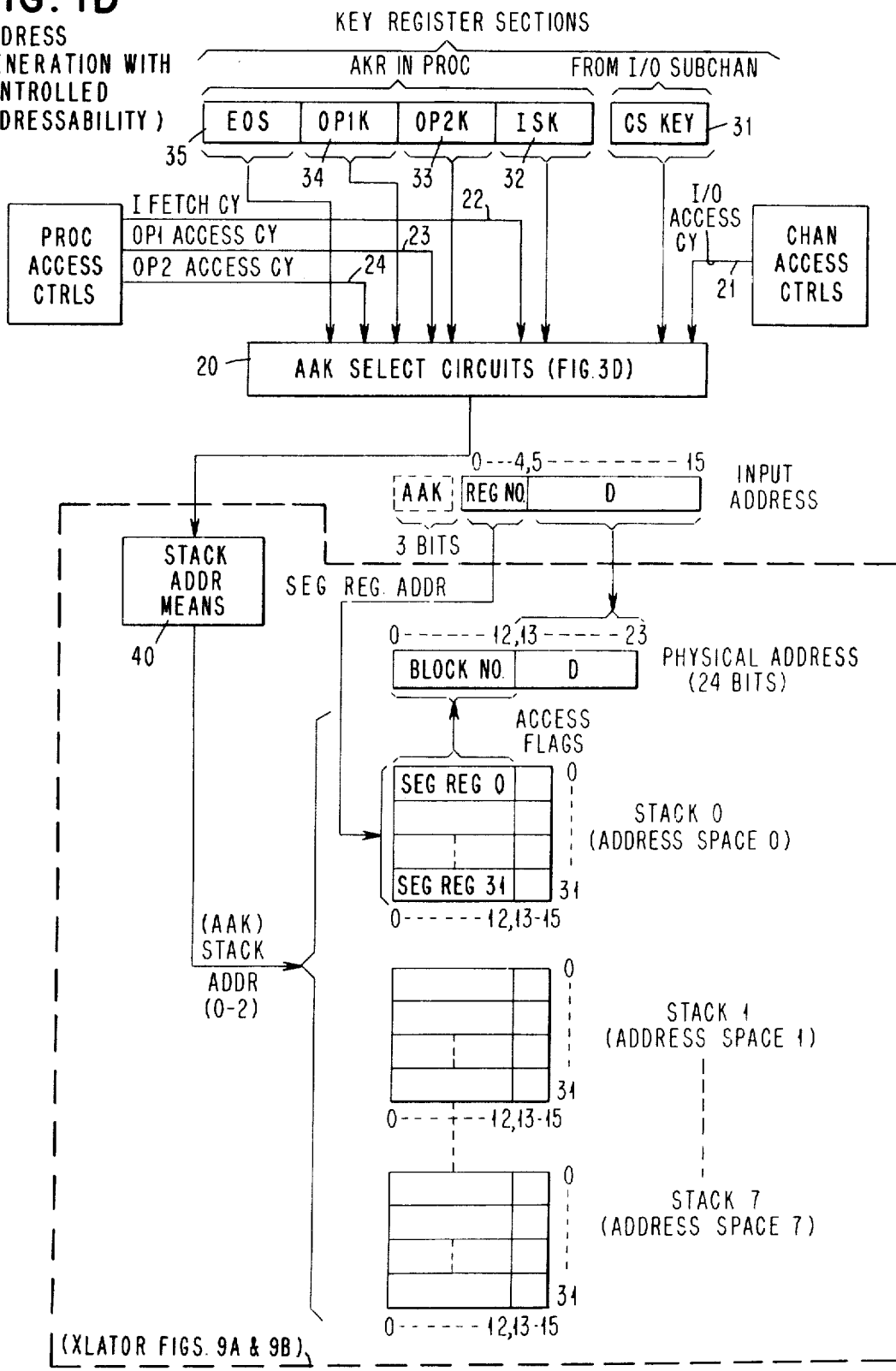

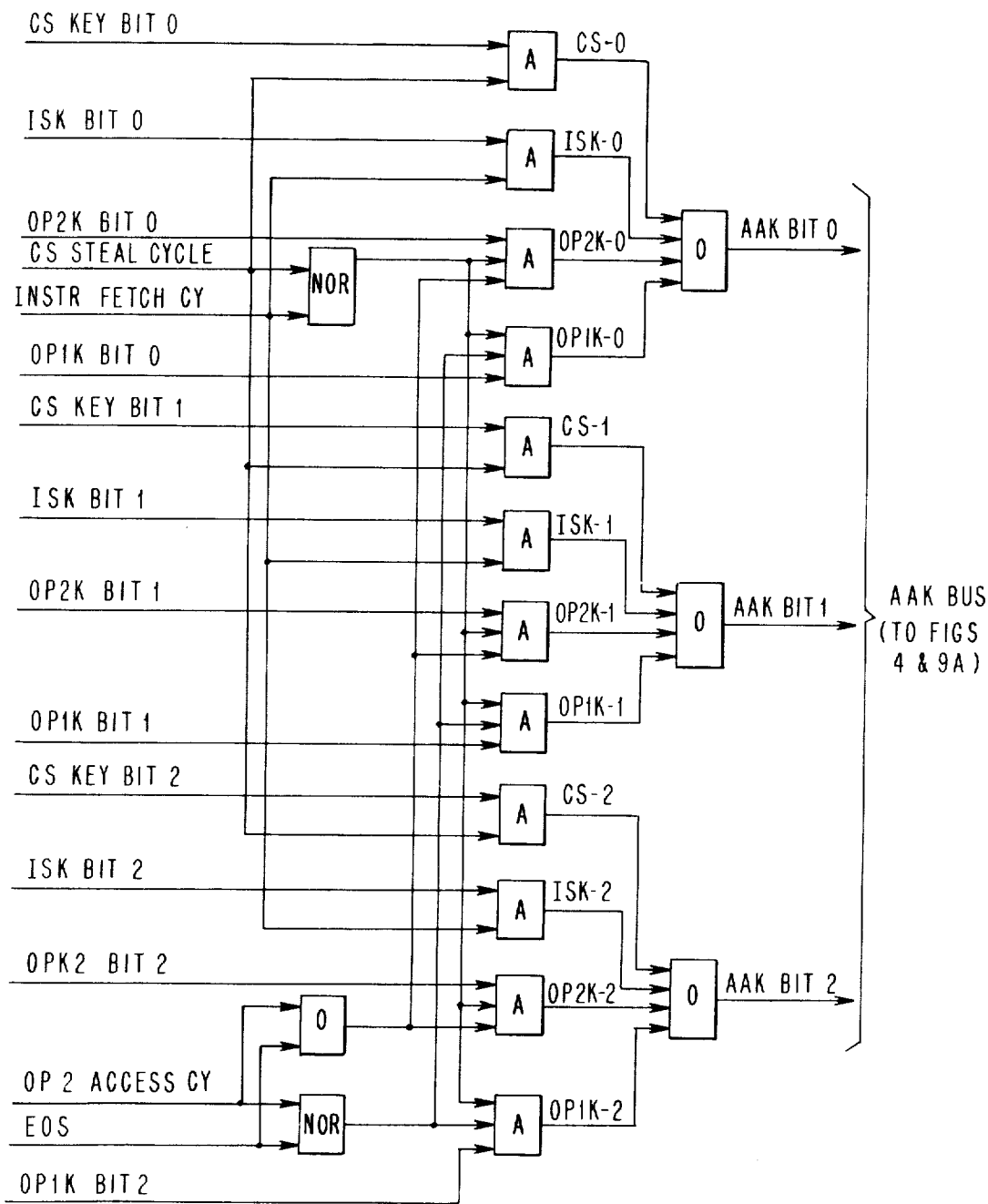
FIG. 3D (AAK SEL CIRCUITS 333)

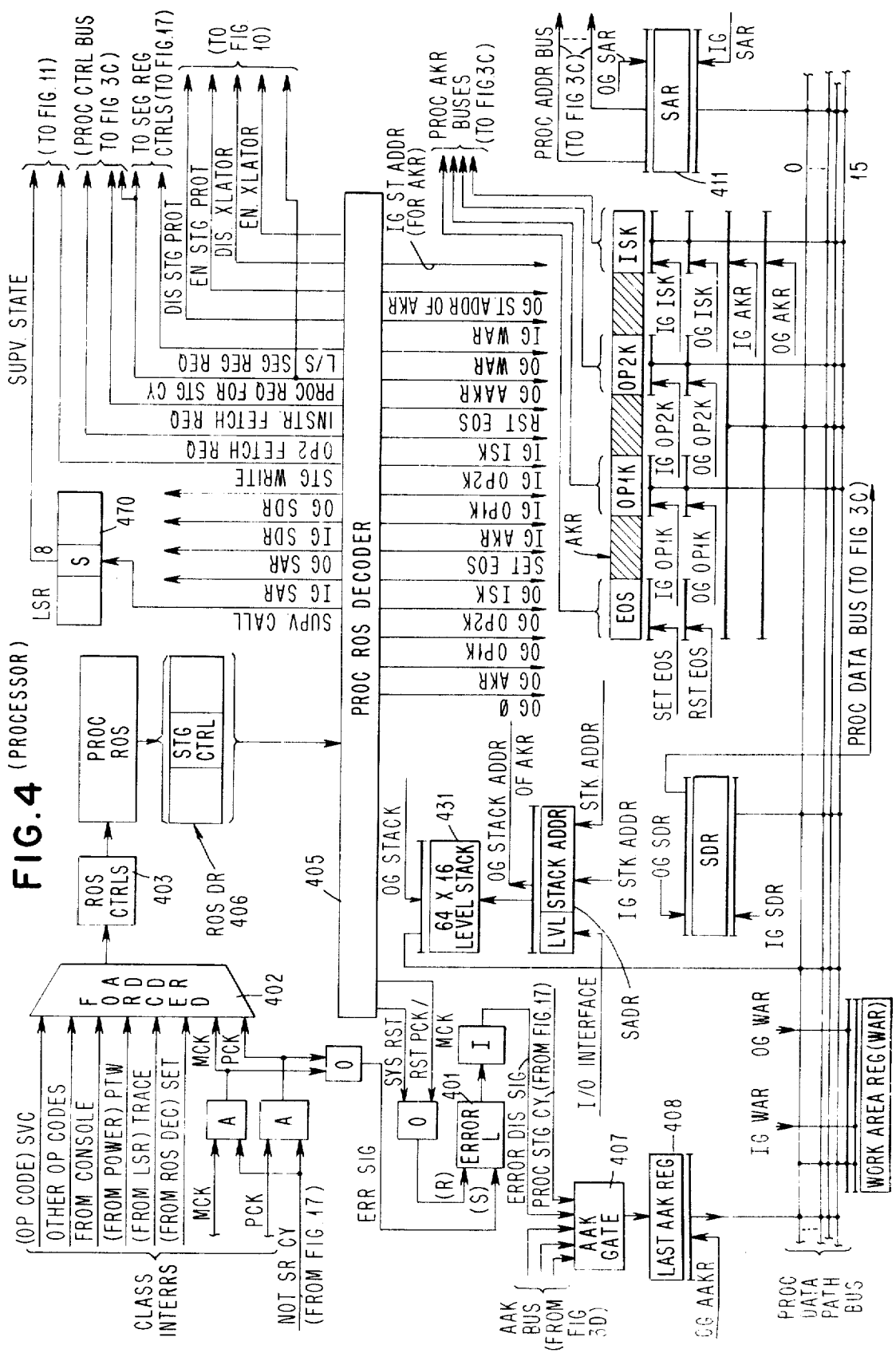
FIG. 4 (PROCESSOR)

FIG. 5 (PROCESSOR ADDRESS KEY REG (AKR))
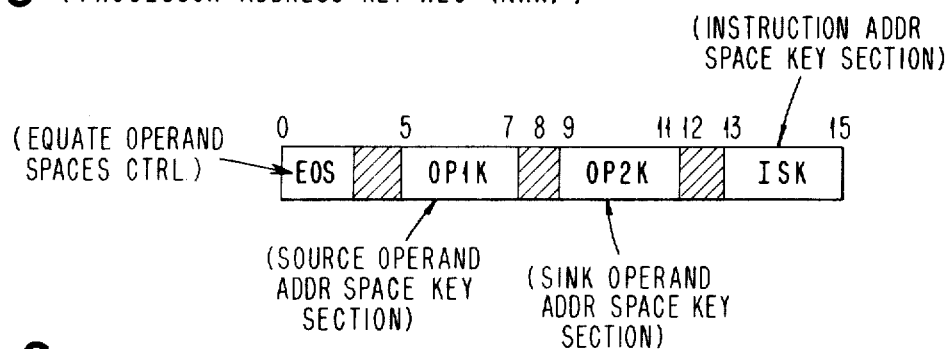
FIG. 6
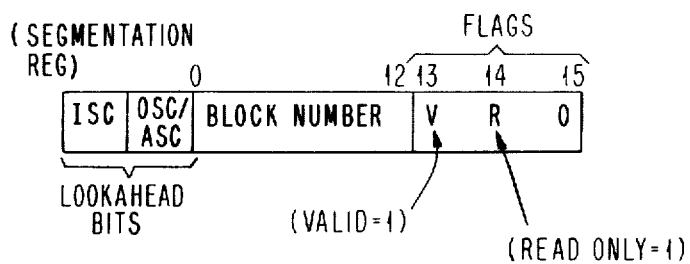
FIG. 7 (AKR INGATE & OUTGATE CONTROLS PER BIT POSITION)
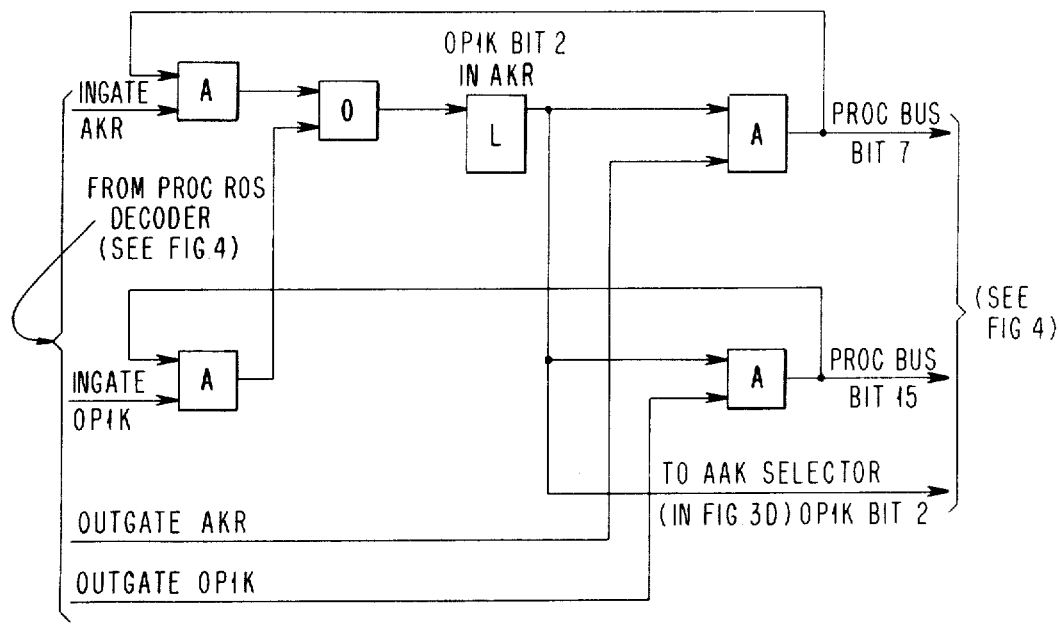

LOAD/STORE SEGMENTATION REGISTER INSTR.

LOAD/STORE AKR STORAGE INSTR.

LOAD/STORE AKR REGISTER INSTR.

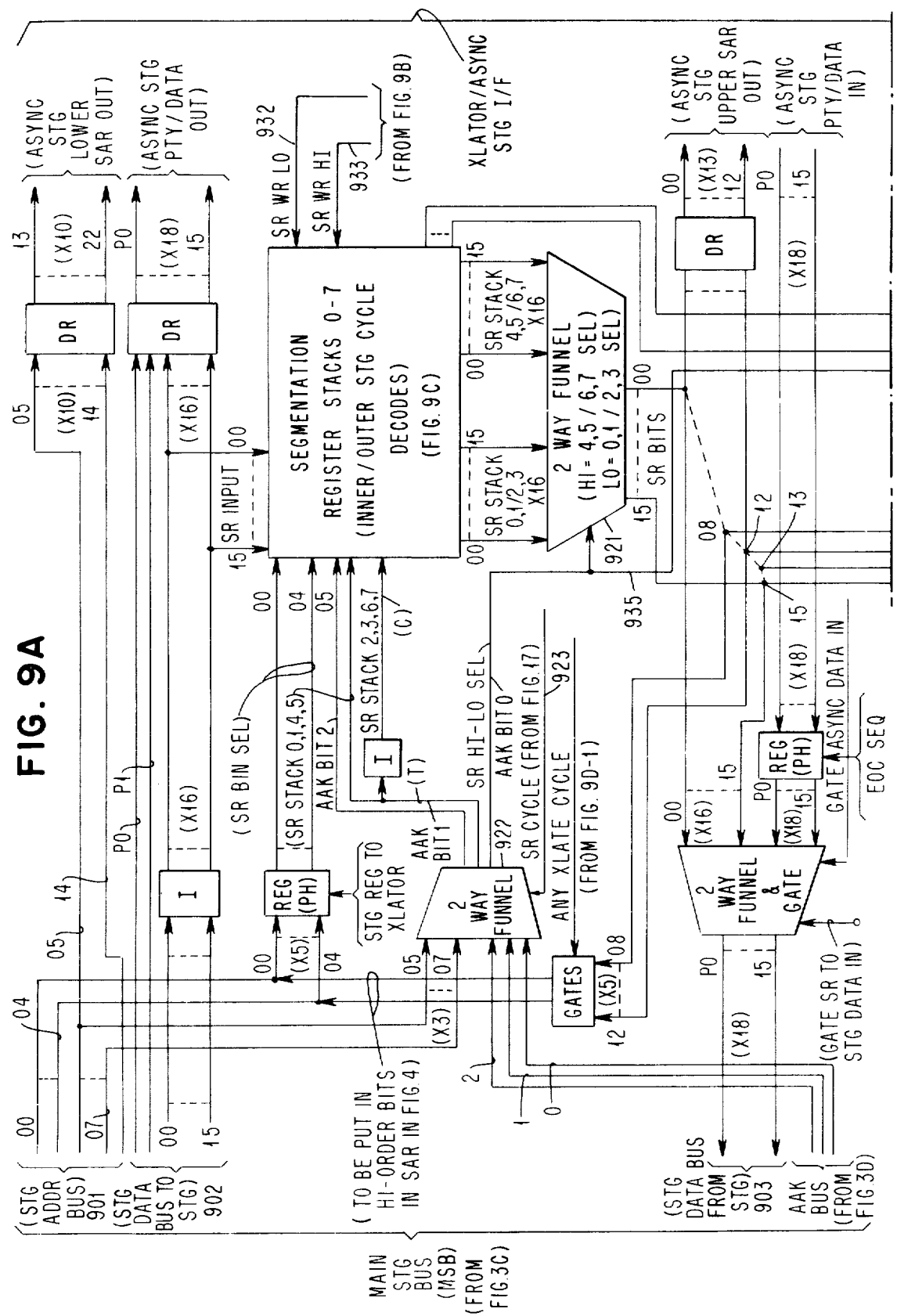

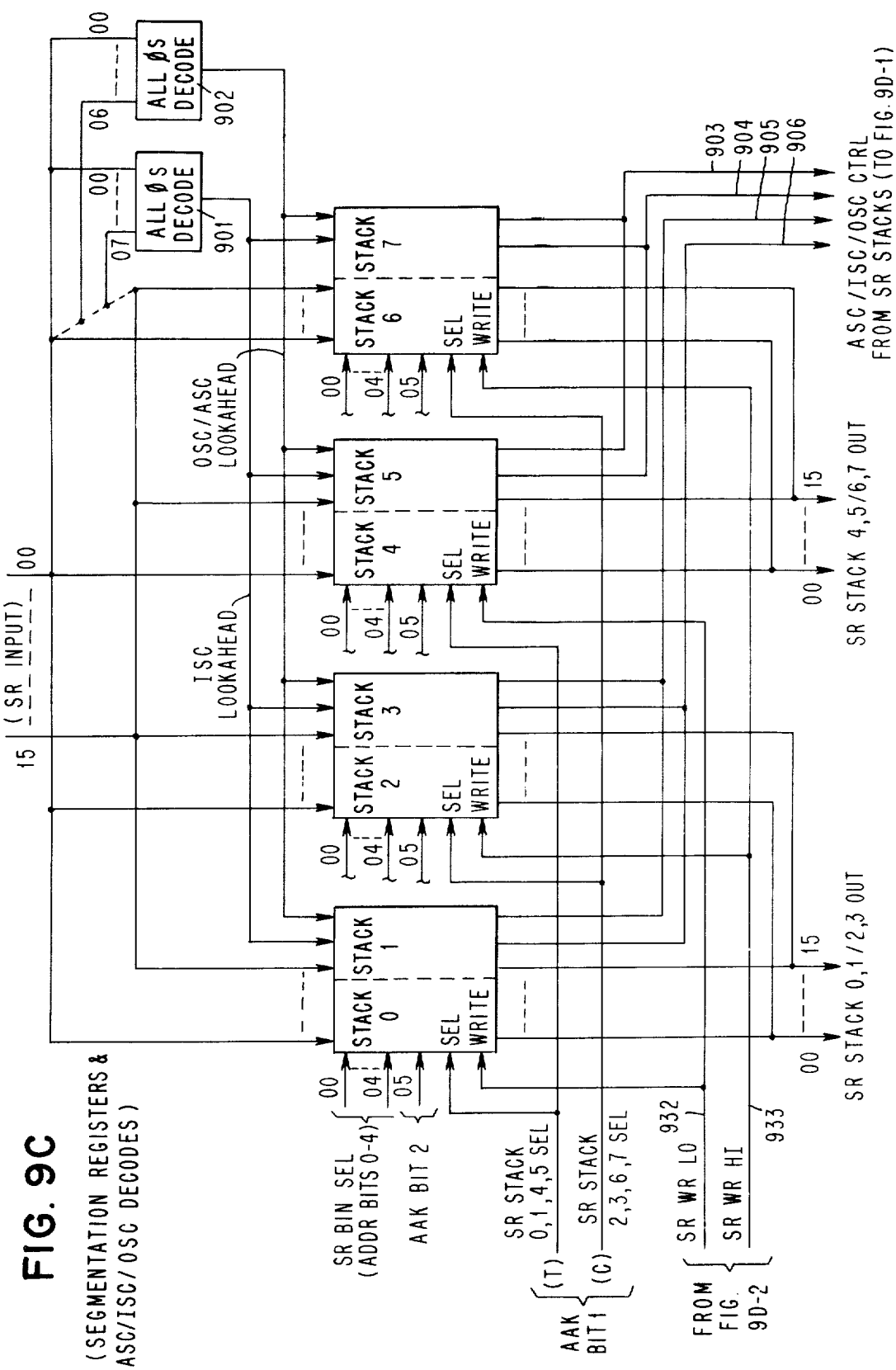
FIG. 9C (SEGMENTATION REGISTERS & ASC/ISC/OSC DECODES)

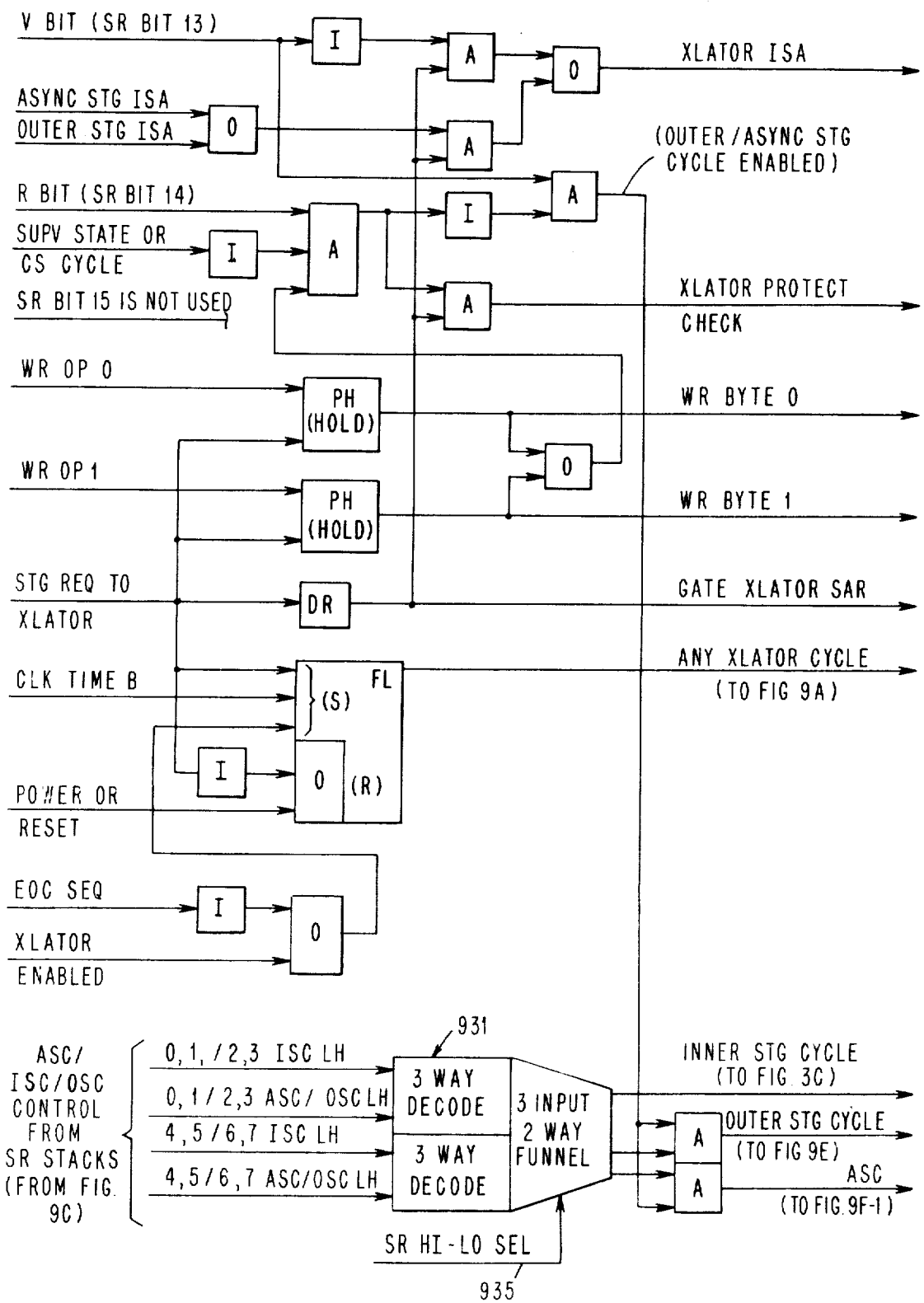
FIG. 9D-1 (BASIC CONTROLS FOR TRANSLATE CYCLE)

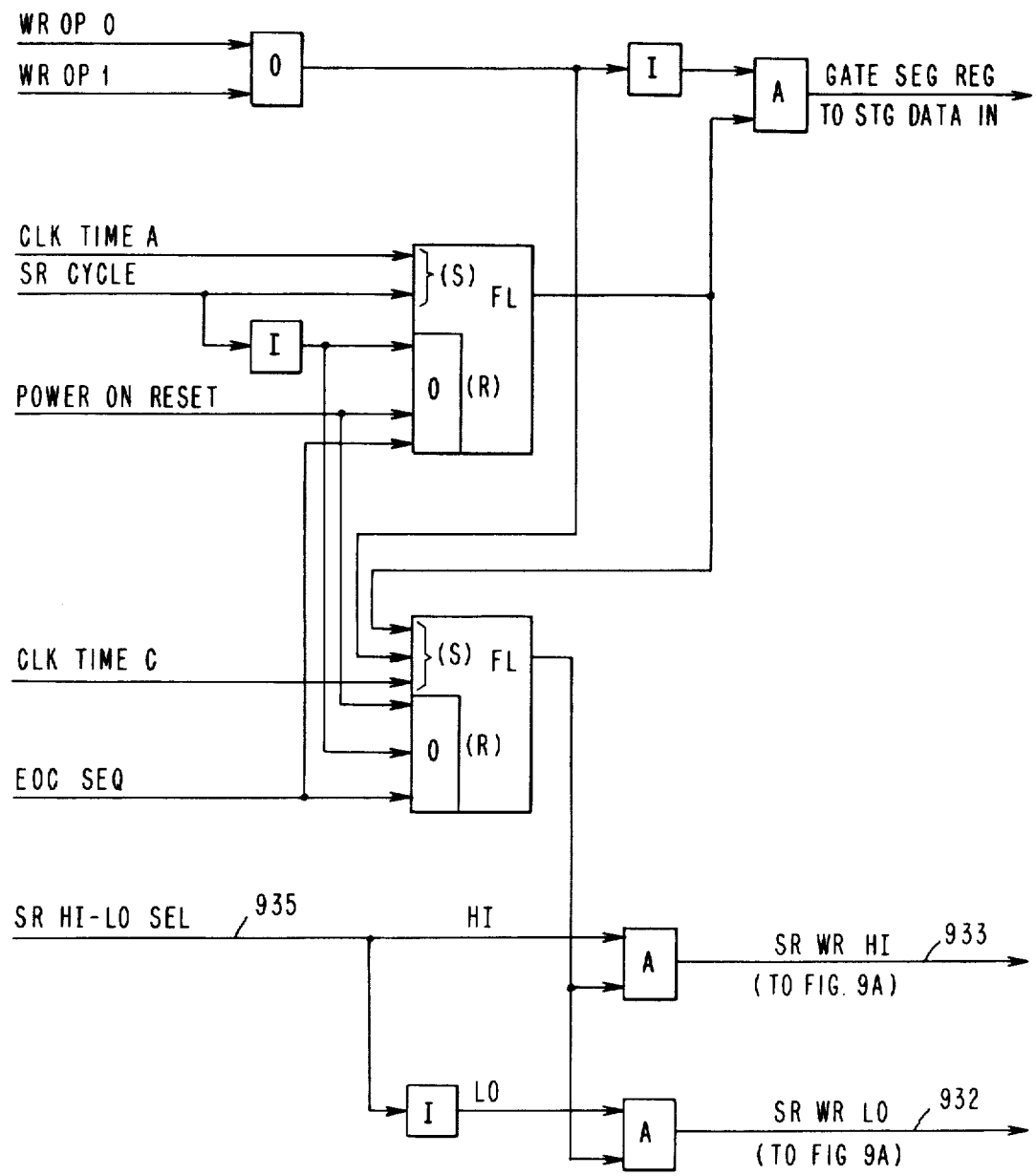
FIG.9D-2 (BASIC CONTROLS FOR SEG REG CYCLE)

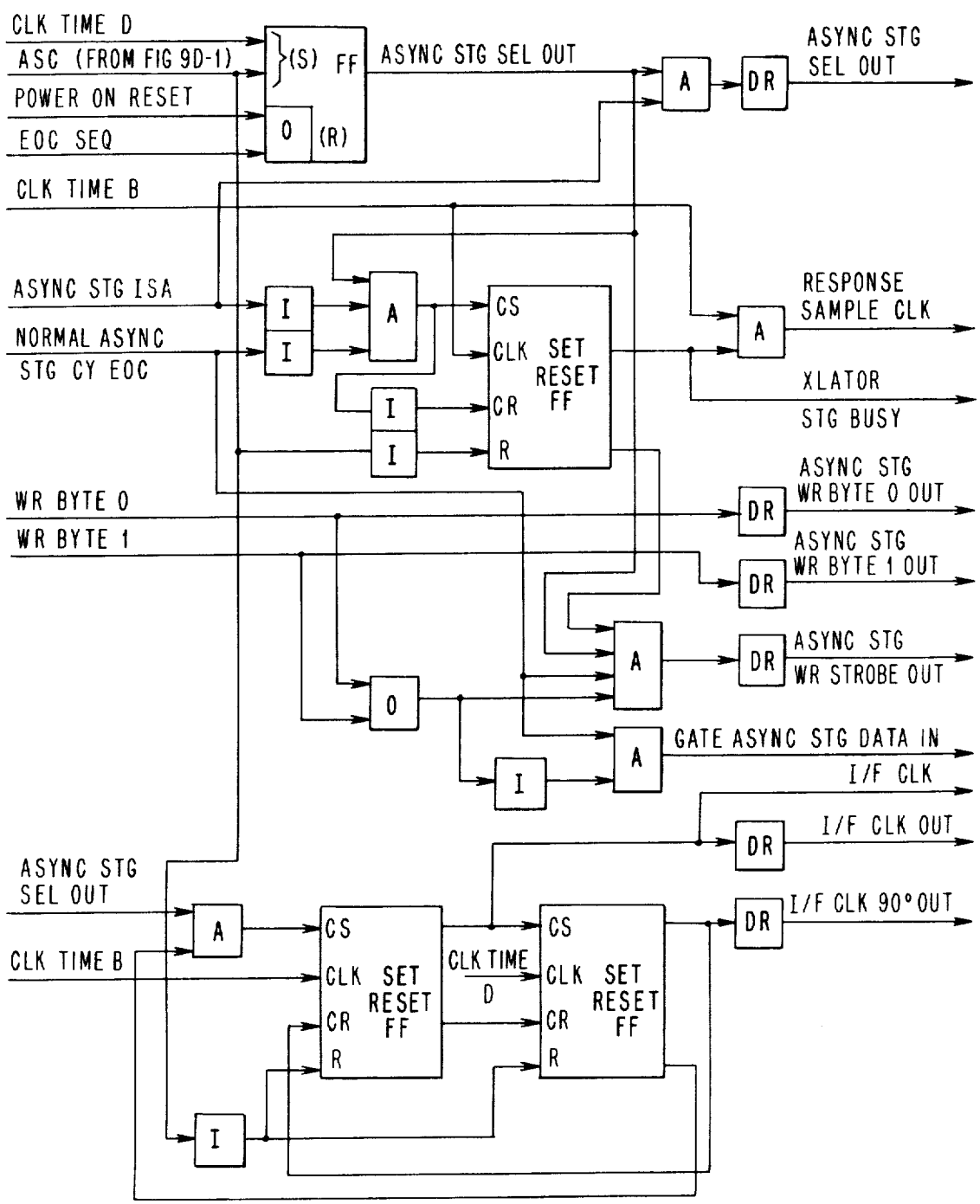
FIG. 9F-1 (ASYNC STORAGE CONTROLS)

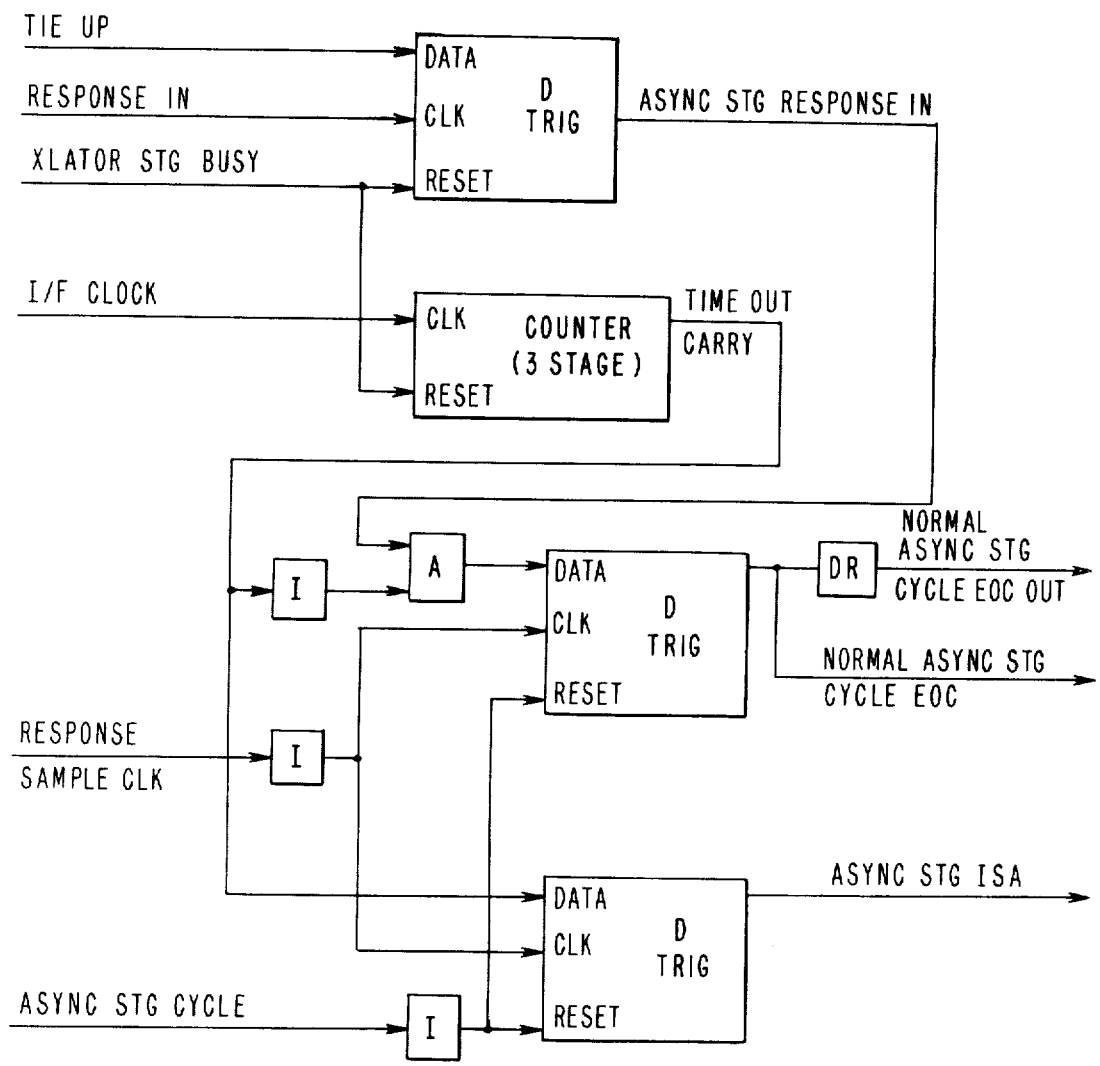
FIG. 9F-2 (ASYNC STORAGE I/F CONTROLS)

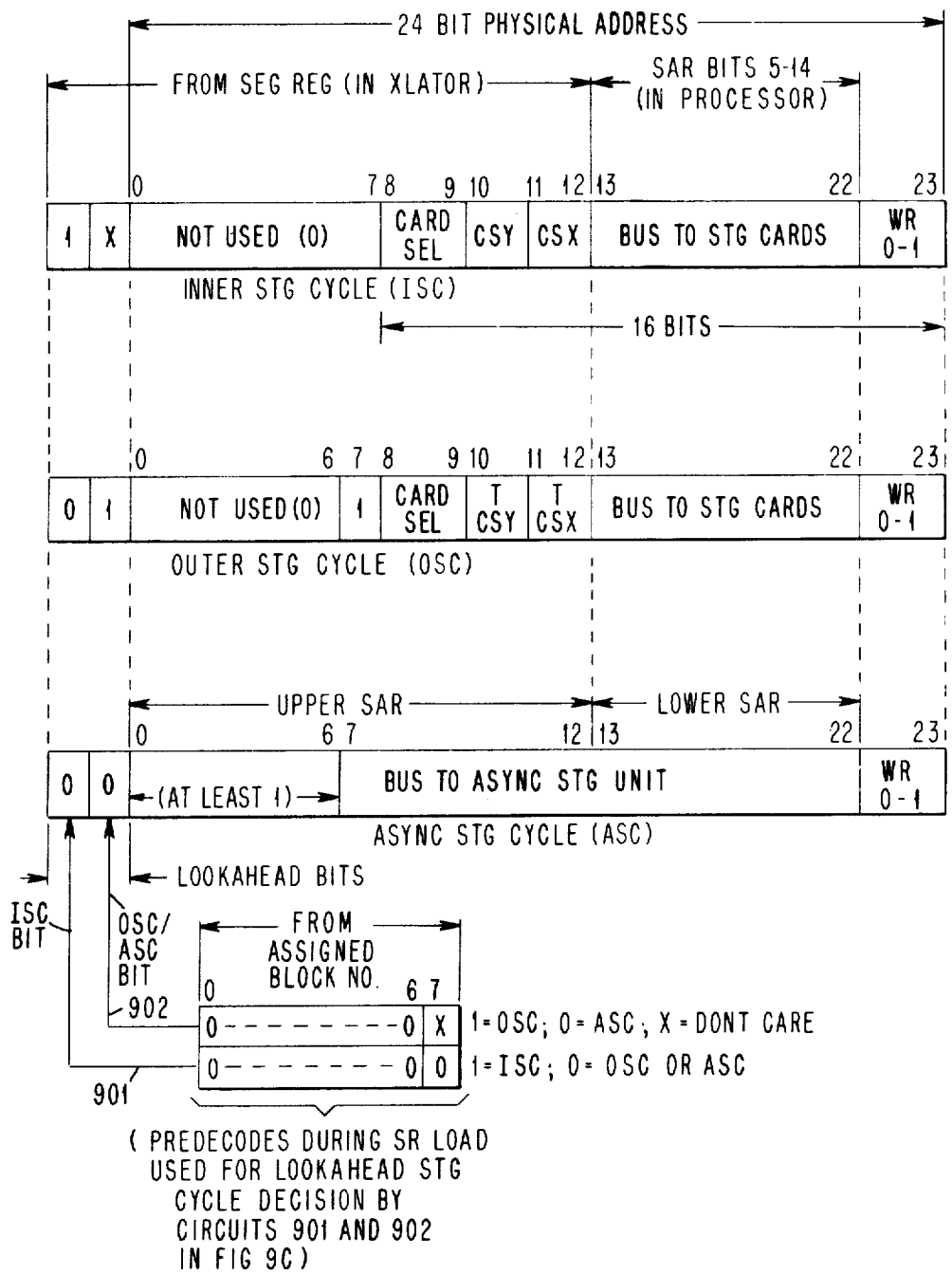
FIG. 9G (TRANSLATOR PHYSICAL ADDRESS GENERATION)

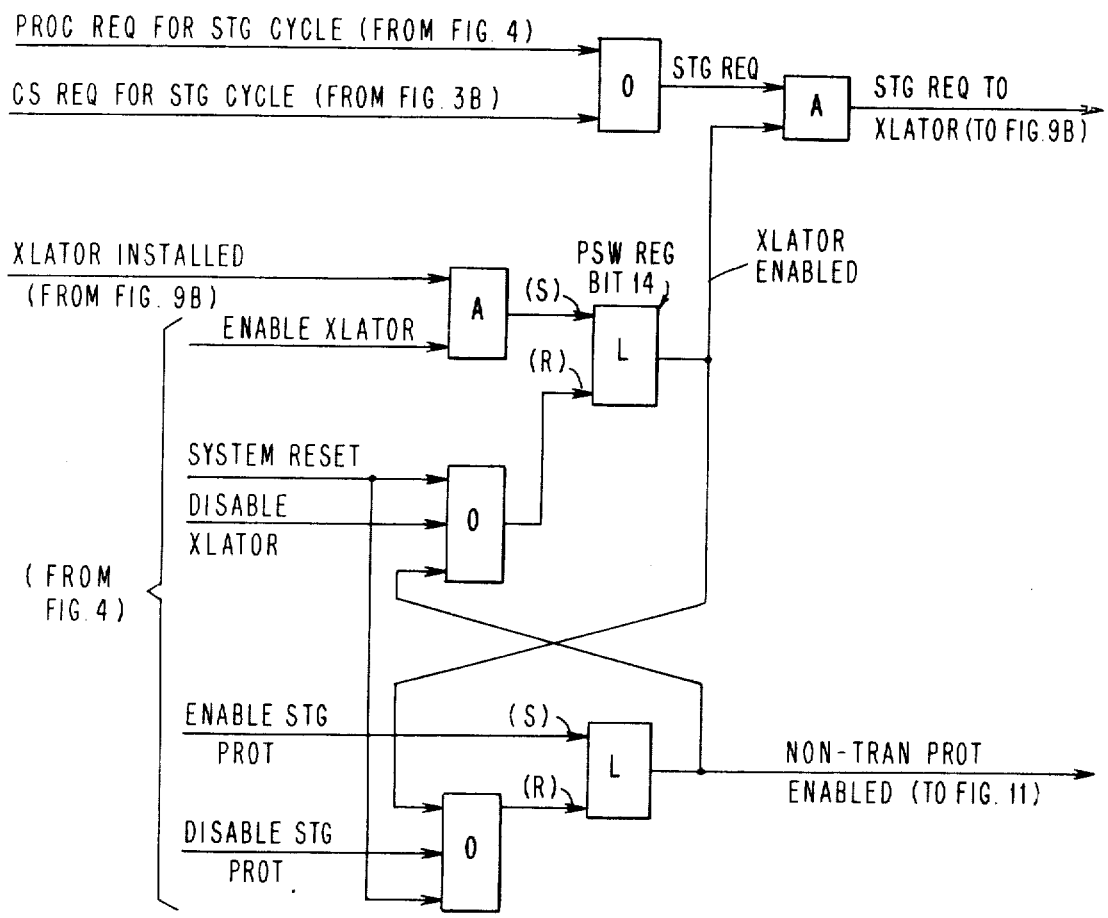
FIG. 10 (CPU SELECTION OF NON-TRAN OR TRAN STG PROTECTION)

FIG. 11 (NON-TRANSLATION PROTECT CTRL CIRCUITS)
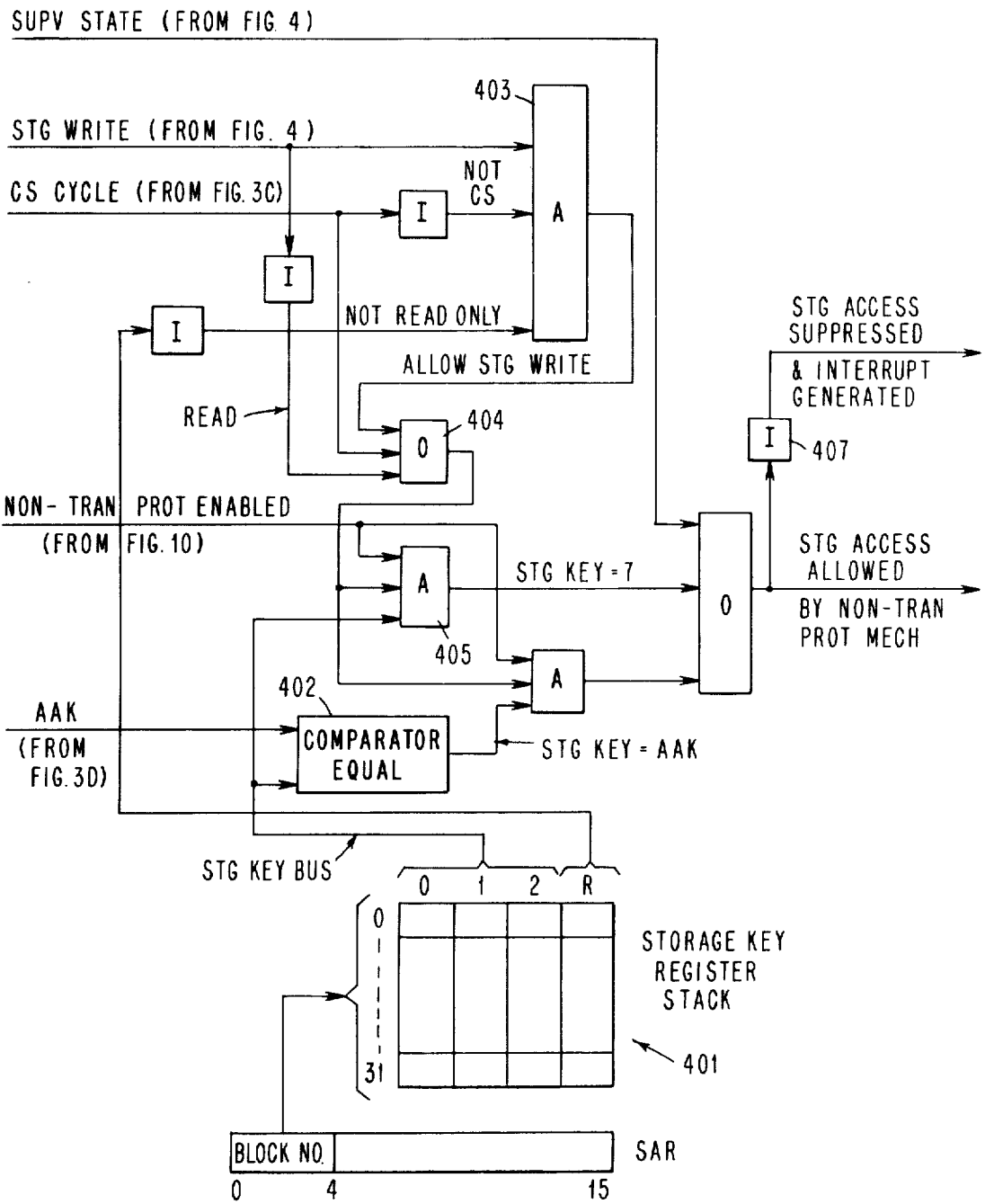

FIG. 12 INSTRUCTION OPERAND FORMAT
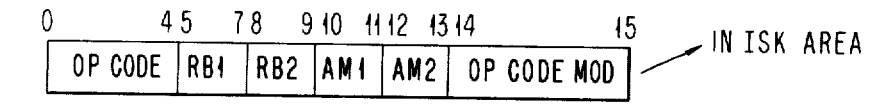
OPERAND ADDRESS 1 = (RB1)+(AM1) ⟶ TO OP1K AREA
OPERAND ADDRESS 2 = (RB2)+(AM2) ⟶ TO OP2K AREA
FIG. 13A ENABLE/DISABLE INSTRUCTION
FIG. 13B
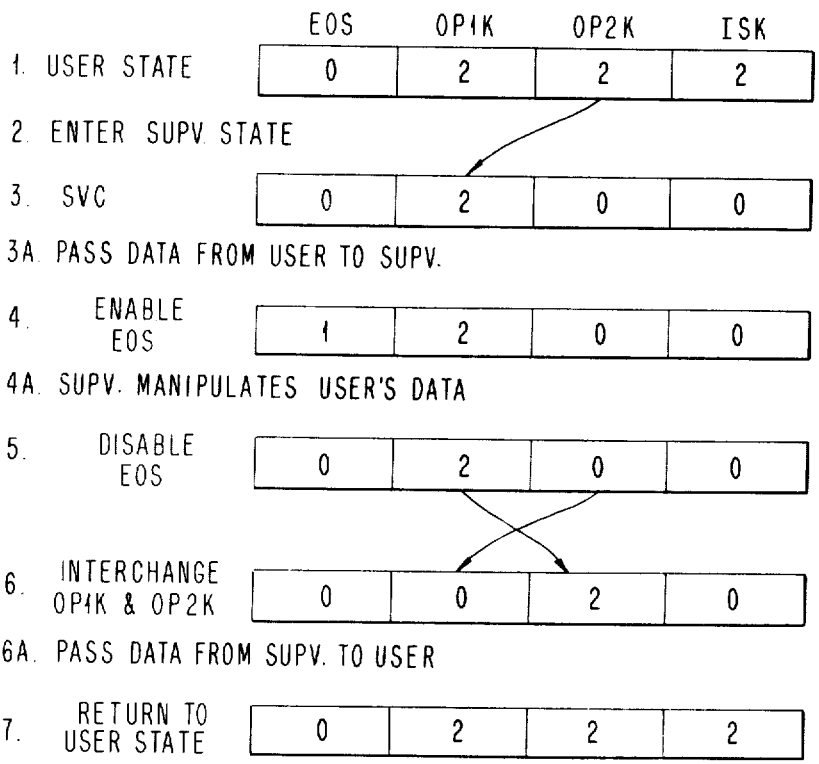

FIG. 14 (ALTERNATE TRANSLATE PROTECT MODE)
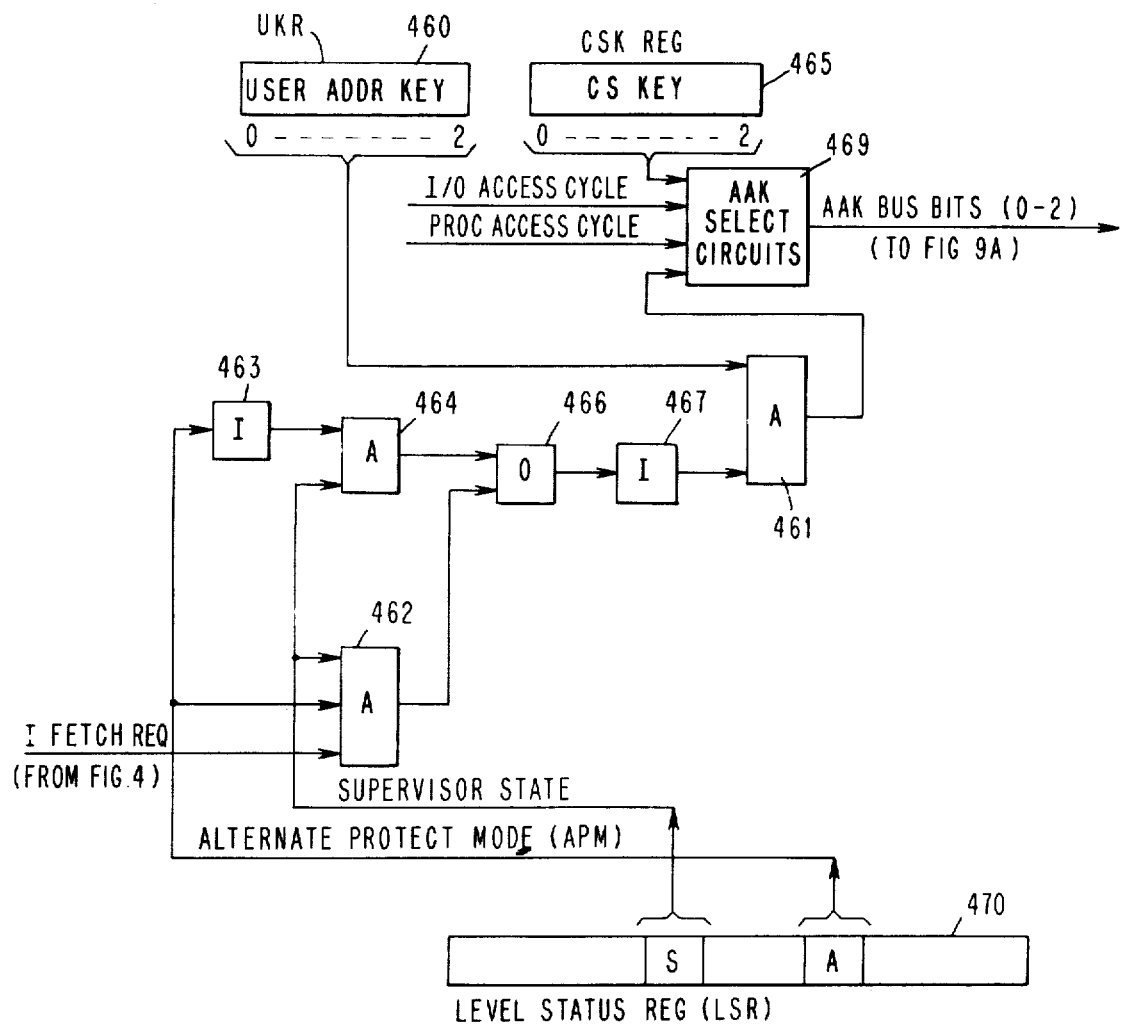
FIG. 15 (ALTERNATE ADDRESS KEY TRANSLATION)
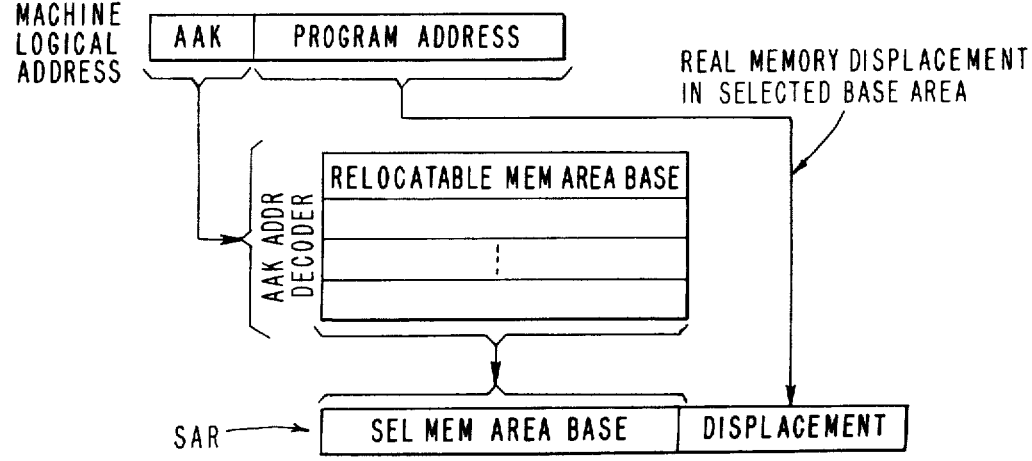

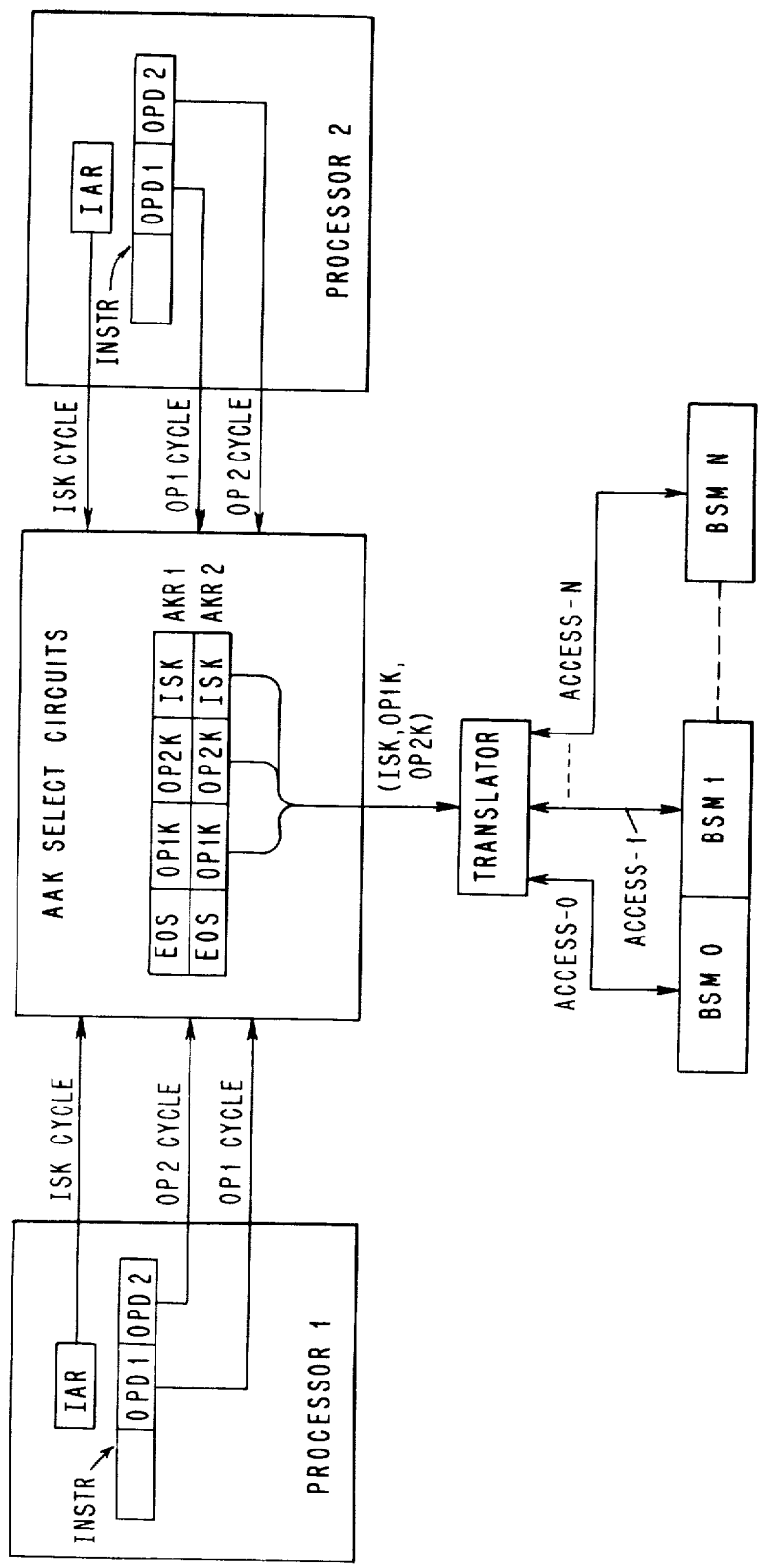
FIG. 16 (MULTI-KEY TRANSLATION WITH PARALLEL BSM ACCESSING & MULTIPROCESSING)

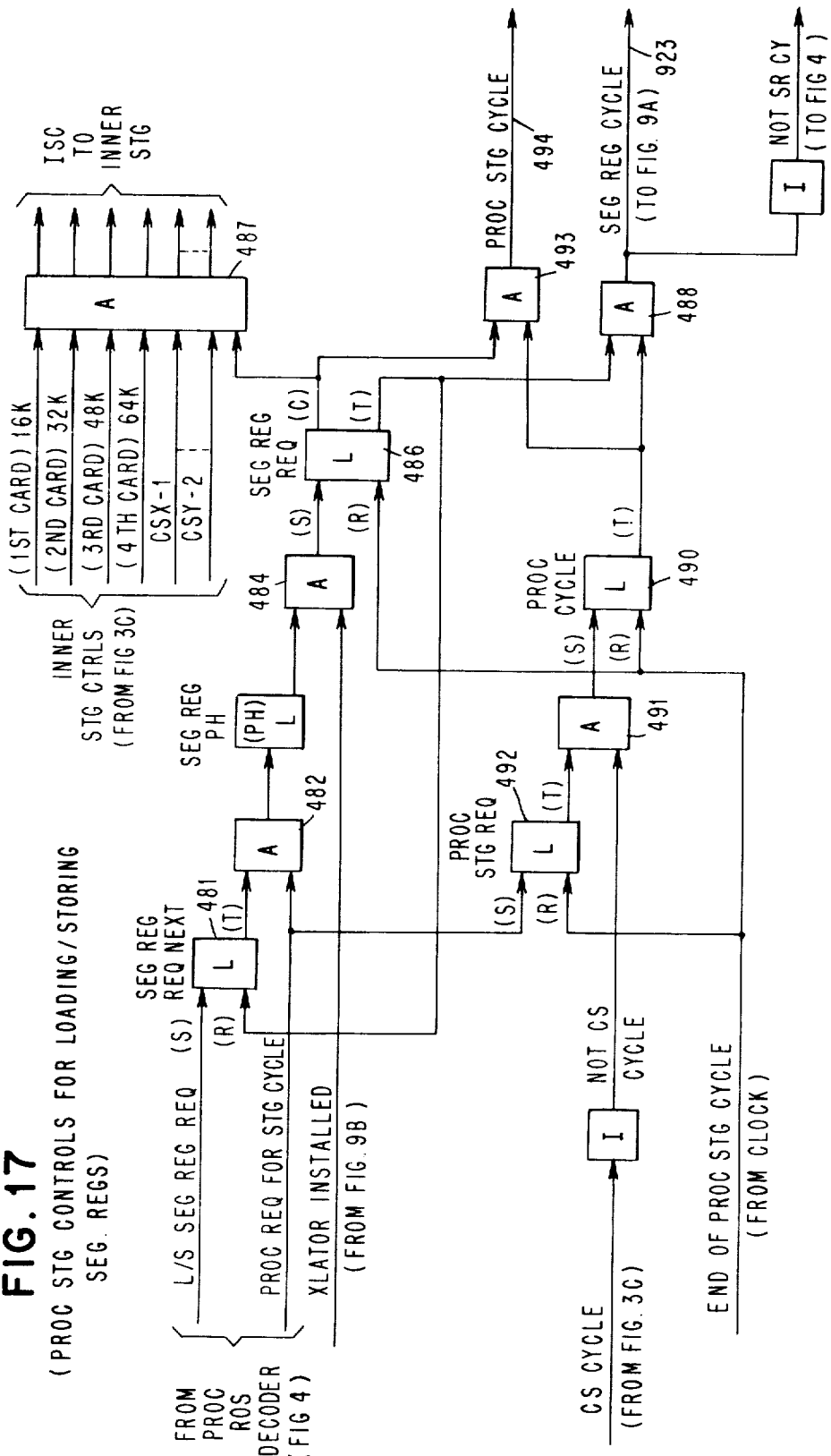
FIG. 17 (PROC STG CONTROLS FOR LOADING/STORING SEG. REGS)

FIG. 18 (SVC EXECUTION EXAMPLE)
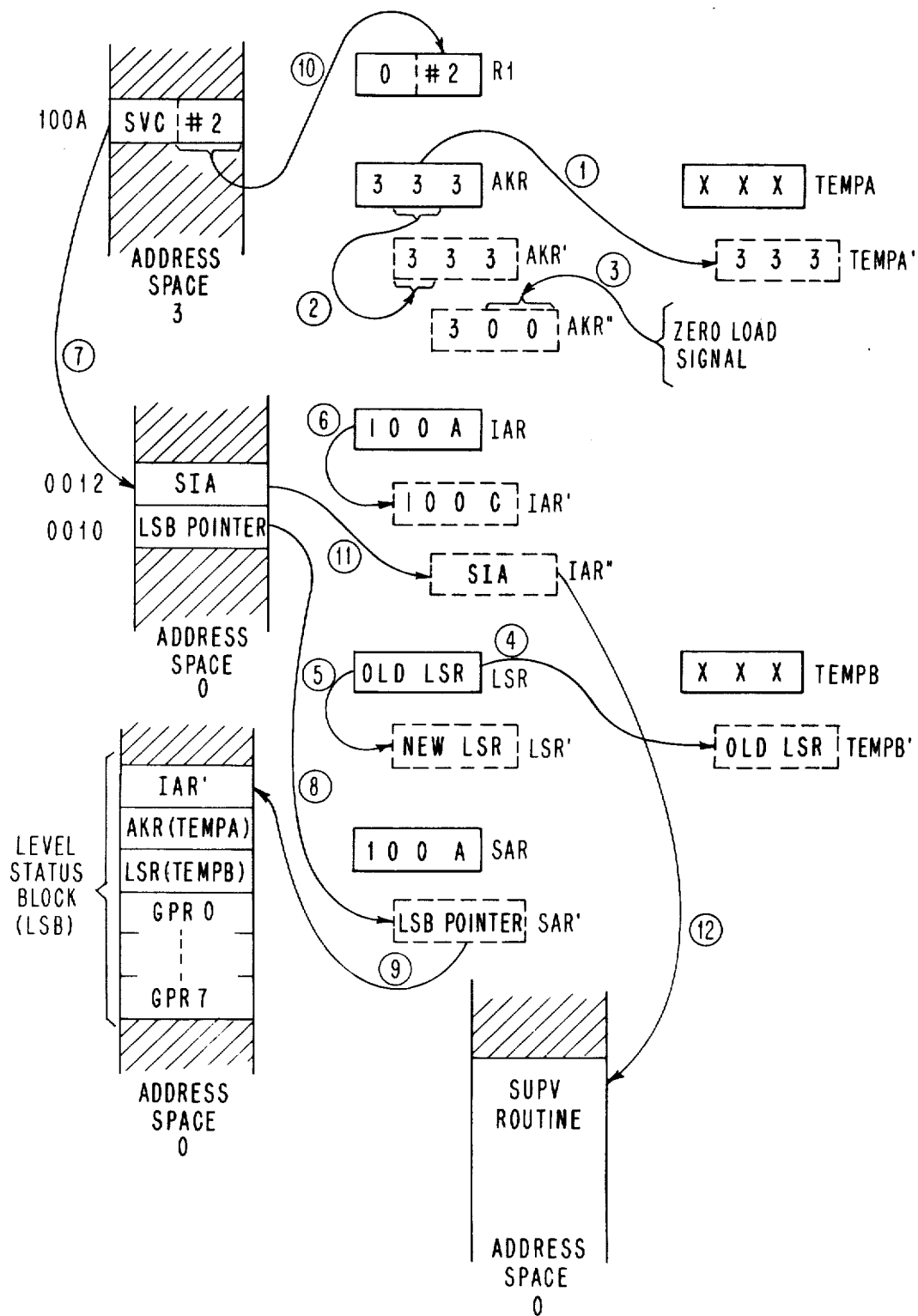

EQUATE OPERAND ADDRESS SPACE CONTROL SYSTEM

INDEX

ABSTRACT
I. INTRODUCTION
   I.A. Related USA Patent Applications
   I.B. Prior Art
II. SUMMARY OF THE INVENTION
III. BRIEF DESCRIPTION OF THE DRAWINGS
IV. INTRODUCTION TO THE PREFERRED EMBODIMENT
   IV.A. Plural Stack Translator
   IV.B. Extendable Main Memory
   IV.C. Space Control in the Preferred Embodiment
      IV.C.1. Processor Space Control
      IV.C.2. I/O Subchannel Space Control
      IV.C.3. Storage Priority Select Circuit
   IV.D. Preferred Processor Embodiment
      IV.D.1. Last AAK Register
      IV.D.2. AKR Load/Store Instructions
   IV.E. Preferred Translator Embodiment
      IV.E.1. Processor/Translator Interface
      IV.E.2. Translator/Outer Storage Interface
      IV.E.3. Translator/Asynchronous Storage Interface
      IV.E.4. Segmentation Register Selection
      IV.E.5. Segmentation Register Load/Store Controls
      IV.E.6. Lookahead Translator Unit Controls
   IV.F. Equate Operand Spaces Feature
   IV.G. Address Space Management by Key Settings in AKR
   IV.H. AKR Loading Under Interrupt Conditions
      IV.H.1. SVC Interrupt
      IV.H.2. Device Interrupt
      IV.H.3. Machine Check, and Program Check/Soft Exception Interrupts
      IV.H.4. Console Interrupt/Power Thermal Warning Interrupt
      IV.H.5. Trace Interrupts
V. NON-TRANSLATION STORAGE PROTECTION CIRCUITS
VI. ALTERNATE TRANSLATE PROTECT MODE
CLAIMS

INTRODUCTION

This invention relates generally to control over processor addressabilities selectable in the main memory of a data processing system. An addressability is an assigned set of physical locations in the main storage of a data processor to represent a logical address space. Logical addresses are used by programmed instructions to locate bytes in a respective logical address space, and through translation the bytes are located in physical locations in a corresponding addressability.

In particular, the invention relates to special processor controls for a key-register controlled addressing system, in which different address key registers (AKRs), or key register sections, correspond to differently selectable addressabilities relating to the same program, in which each addressability is an address space in the main memory for supporting up to a full range of logically programmable addresses. Different addressabilities are provided by different address keys in the different sections of an AKR associated with the different machine-identified storage access types. In an AKR, source operands may be provided with a different addressability from sink operands, and these operands may each be provided with different addressabilities from the program instructions which require these operands.

Any address key loaded into the AKR, when selected as an active address key, becomes the high-order part of a logical machine address for a storage access. The active address key addresses parts of main memory comprising an address space in which all accesses of the same machine-identified type are restricted; and these parts of main memory are automatically protected against other machine-identified types of storage accesses using a different address key.

RELATED U.S.A. Patent Applications

The subject application is related to other applications having different joint inventorships filed on the same day and owned by the same assignee. These other applications are:

| Serial No | Title | Inventor(s) |
|---|---|---|
| 681,982 | Address Key Register | R. E. Birney, M. I. Davis, |
|  | Load/Store Instruction | L. A. Graybiel, R. A. Hood, S. Kahn and W. S. Osborne |
| 681,984 | Key Register Controlled Accessing System | R. E. Birney and M. I. Davis |
| 682,222 | Key Controlled Address Relocation Translation | R. E. Birney, M. I. Davis and R. A. Hood |
| 682,223 | Outer and Asynchronous Storage Extension System | D. G. Bourke and F. J. Puttlitz |
| 682,224 | Non-Translatable Storage Protection Control System | R. E. Birney and M. I. Davis |
| 681,985 | Supervisor Address Key Control System | R. E. Birney, M. I. Davis, R. A. Hood, T. S. McDermott and L. E. Wise |
| 682,226 | System for Controlling Address Keys Under Interrupt Conditions | R. E. Birney, W. S. Osborne and L. A. Graybiel |
| 681,953 | Task Management Apparatus | M. I. Davis |
| 682,002 | Data Processing System Featuring Subroutine Linkage Operations Using Hardware Controlled Stacks | M. I. Davis, T. S. McDermott, G. W. Mayes, and L. E. Wise |
| 681,983 | Common Polling Logic for Input/Output Interrupt or Cycle Steal Data Transfer Requests | M. A. Bouknecht, D. G. Bourke and L. P. Vergari |
| 682,229 | Input/Output Interface Logic for Concurrent Operations | M. A. Bouknecht, M. I. Davis and L. P. Vergari |
| 682,228 | Residual Status Reporting During Chained Cycle Steal Input/Output Operations | D. G. Bourke and L. P. Vergari |
| 682,227 | Translator Lookahead Controls | D. G. Bourke |

SUMMARY OF THE INVENTION

The subject invention provides a special control over the different addressabilities provided by different address keys in an address key register (AKR) in a processor. The special control is an equate operand spaces (EOS) feature which forces all operand accesses by a program to occur within the sink operand addressability, even though the AKR contains a key for providing a different addressability for source operands. When the EOS feature is disabled, the source operand addressability contained in the AKR is used when fetching source operands.

The EOS feature is provided by means of circuits associated with the address key register for forcing a ource operand request to outgate the sink operand address key as the active address key for the access. The source operand address key in the AKR is not disturbed, and upon disabling of the EOS state, the processor resumes any separate addressabilities available for the source and sink operands.

It is therefore a primary object of this invention to provide an equate operand spaces feature in a processor having an address key register with plural key sections.

It is another object of this invention to provide an EOS feature in a processor having an AKR for forcing source operands accesses to occur in the sink operand address space whenever the EOS feature is enabled.

It is a further object of this invention to provide an EOS feature which, when disabled, permits separate addressability for source and sink operands.

These and other objects, features and advantages of the invention may be more fully understood and appreciated by considering the following detailed description in association with the accompanying drawings.

III. BRIEF DESCRIPTION OF THE DRAWINGS

FIG. 1A-1 generally illustrates an access-type register concept, in which an active address key (AAK) is selected by a storage request for a machine-identified storage access type for controlling the physical accessing of a main memory.

FIG. 1A-2 generally illustrates an address key translator concept, in which a main memory physical address is generated from a logical input address comprised of a machine-generated AAK and a program apparent address.

FIG. 1D conceptualling illustrates the preferred embodiment described in this specification.

Figure 2A:
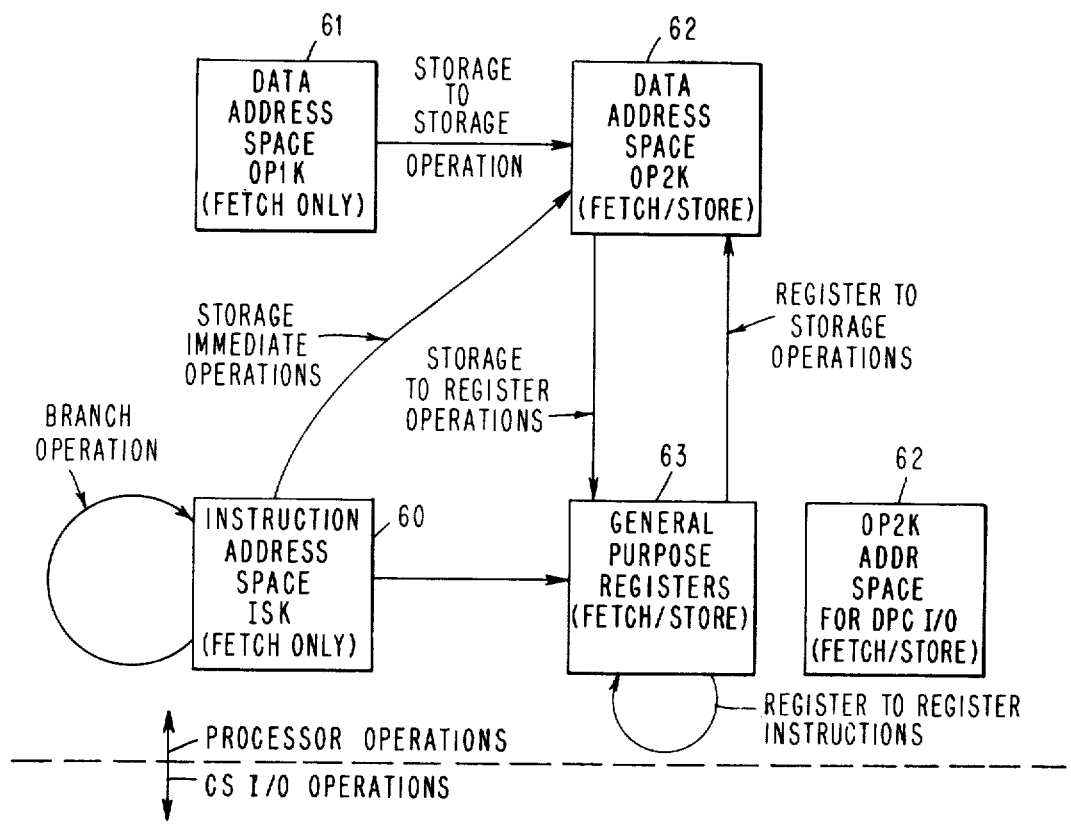

FIG. 2A is a diagramatic representation of controlled address spaces obtainable in the detailed embodiment during operation of a processor and its I/O.

Figure 2B:
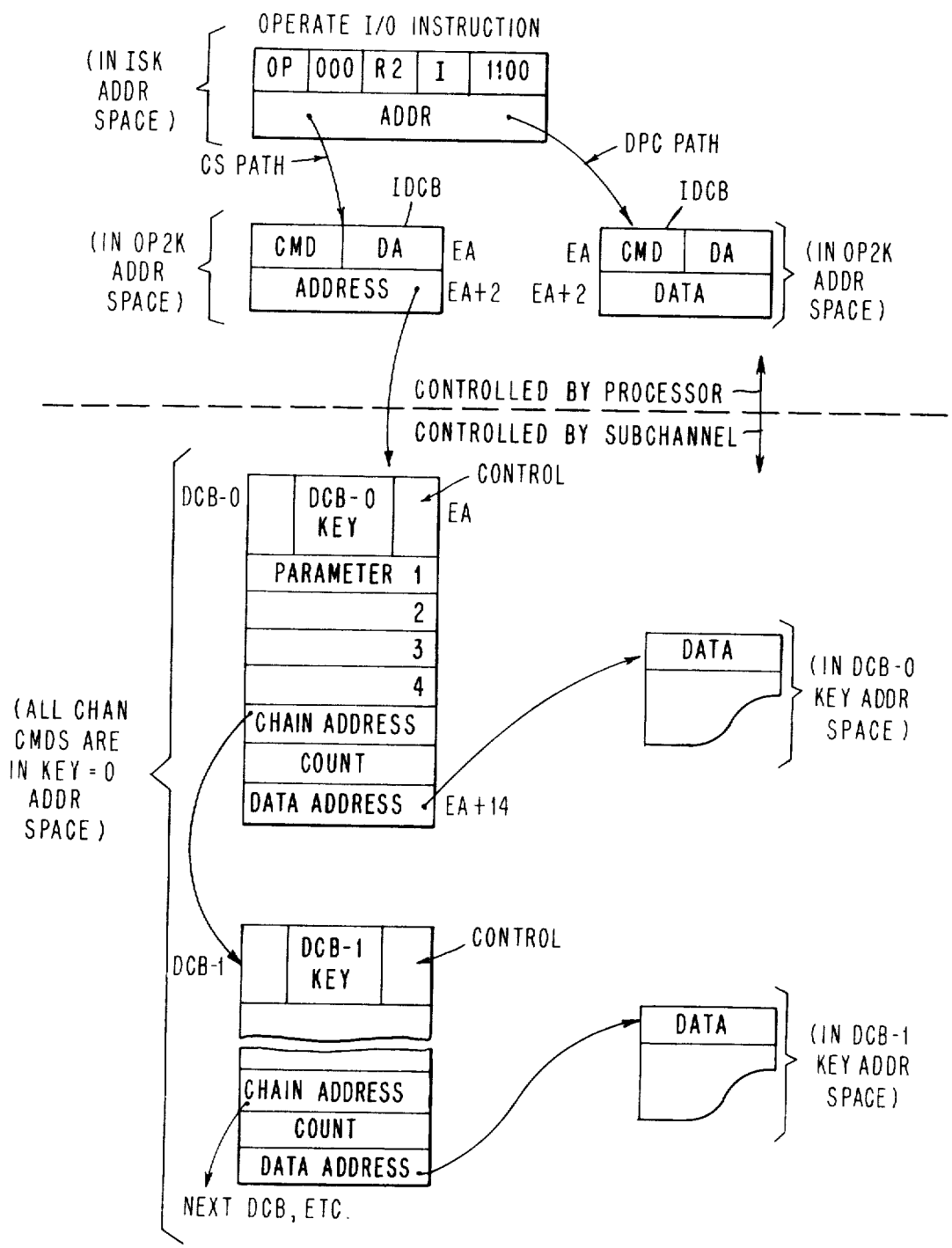

FIG. 2B illustrates address space control for I/O operations in the detailed embodiment of the invention executing an operate I/O instruction.

Figure 3A:
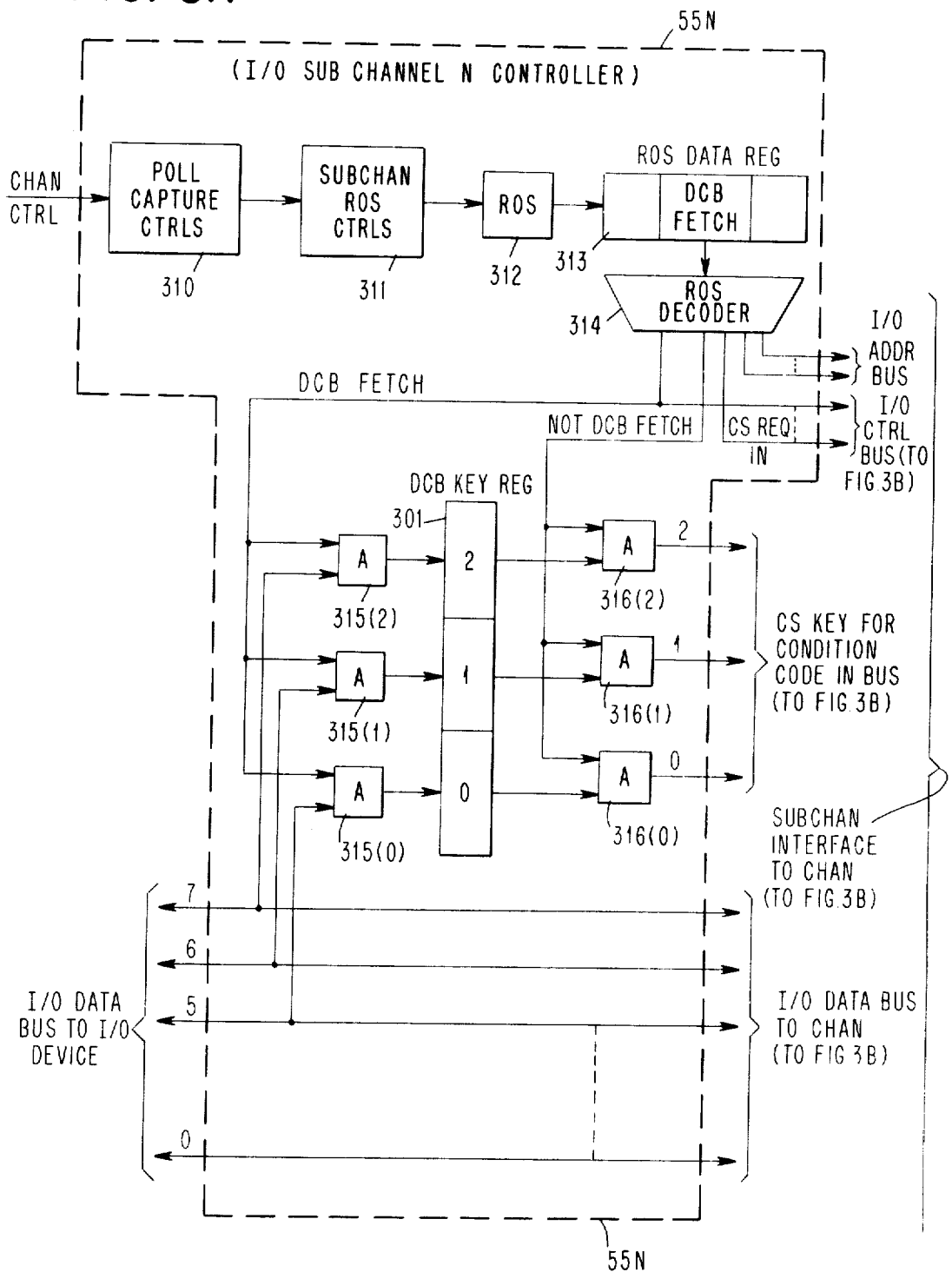

FIG. 3A represents an I/O subchannel N which receives an address key (i.e. CS key) with each subchannel command (i.e. DCB) and provides the address key for each data access to memory for executing the command.

Figure 3B:
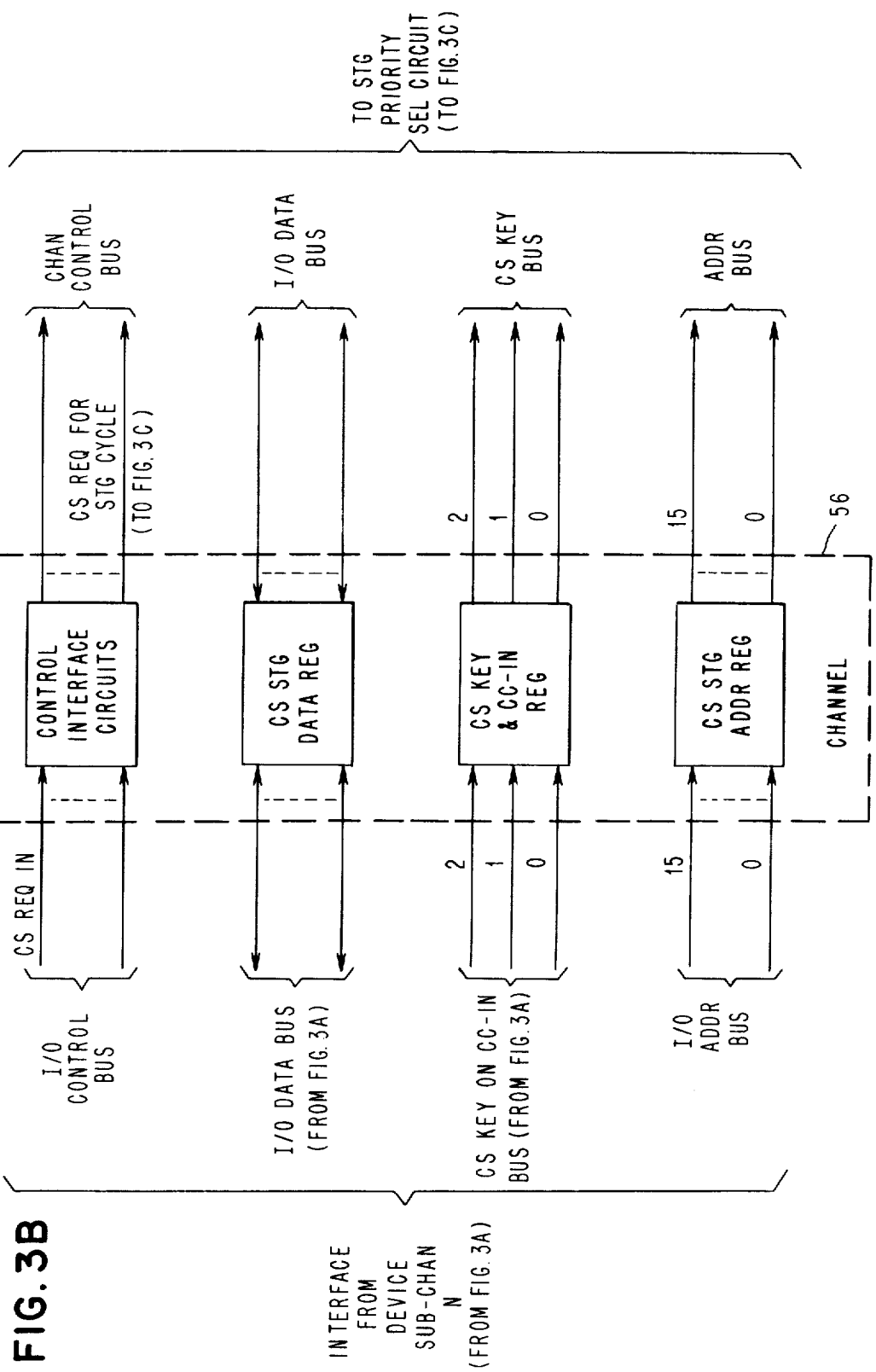

FIG. 3B illustrates the pertinent parts of an I/O channel which connects a plurality of subchannels to a storage priority select circuit.

Figure 3C:
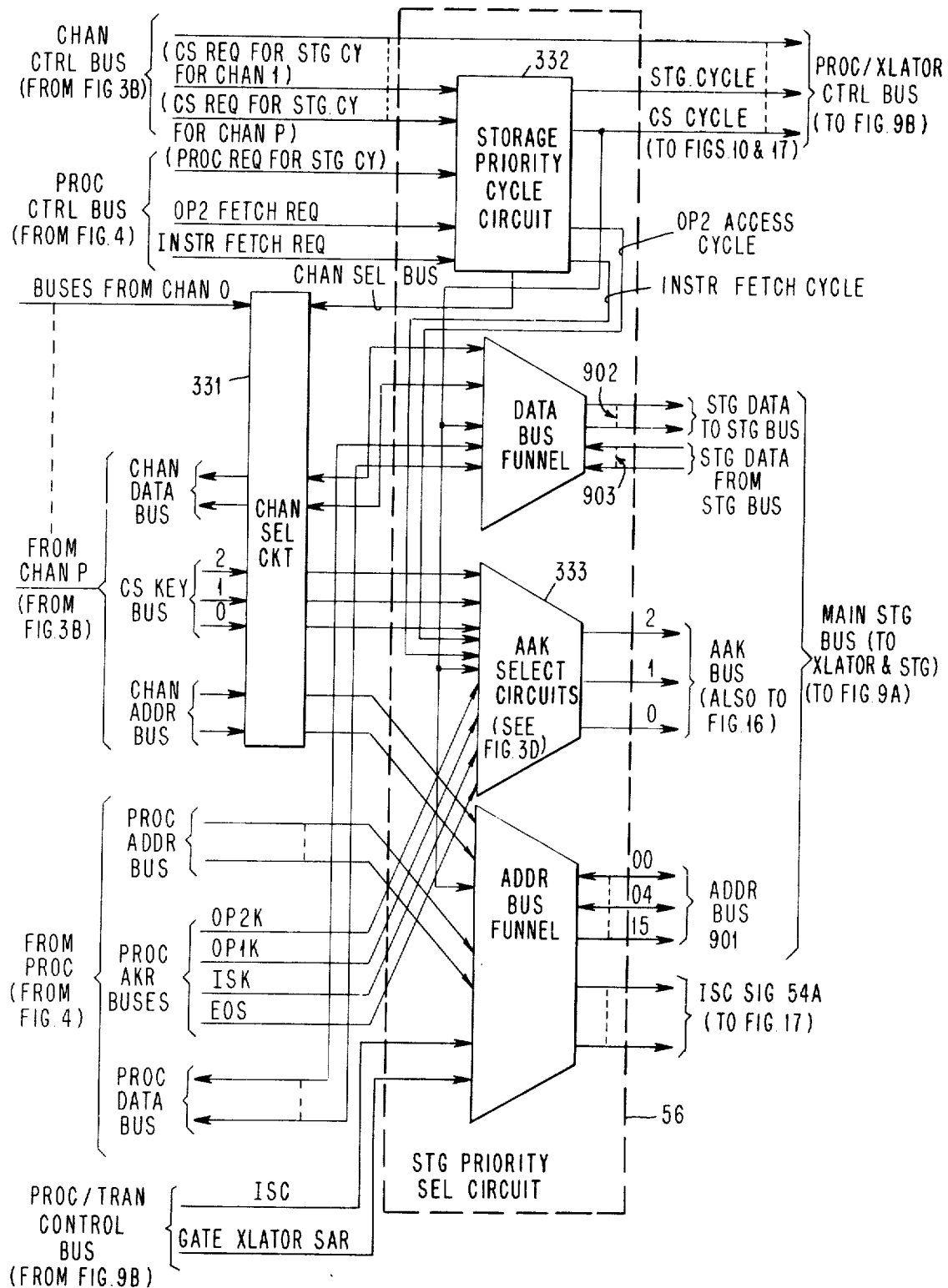

FIG. 3C illustrates a storage priority select circuit which receives storage access requests and their respective address keys from a processor and its one or more channels to select each active address key (AAK) and an associated program derived address, which are transferred to a translator for physical address generation and then to the main memory for accessing the information.

FIG. 3D is a preferred embodiment of an AAK select circuit, which contains the equate operand spaces (EOS) features.

FIG. 4 shows internals of a processor which support address key control.

FIG. 5 shows the format for the contents of the processor's address key register (AKR) used in the detailed embodiment.

FIG. 6 shows the format of the contents of each segmentation register found in the detailed embodiment.

FIG. 7 is a detailed diagram of the ingate and outgate controls for a bit position in the address key register (AKR).

Figure 8A:
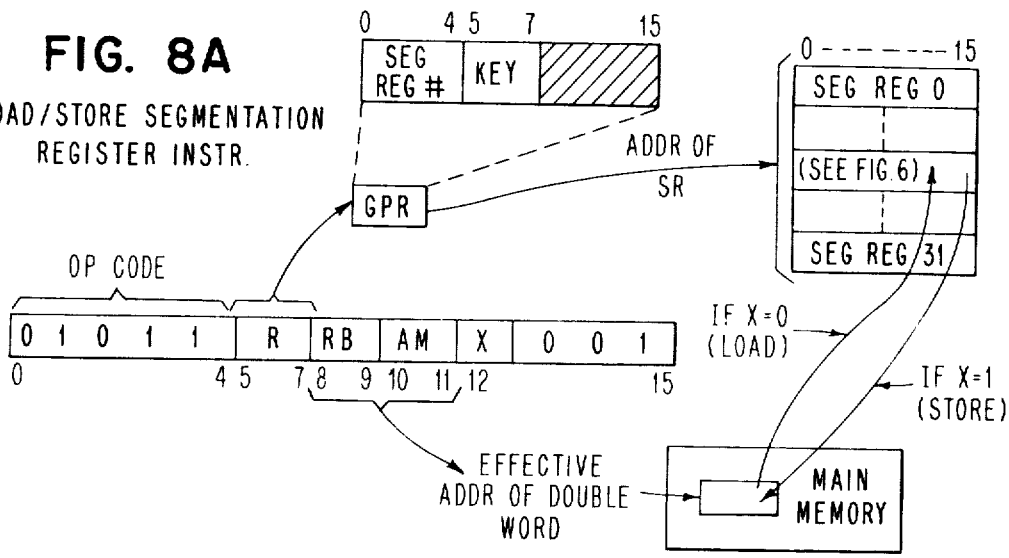

FIG. 8A illustrates diagramatically the operation of the load/store segmentation register instruction, in which one or more designated segmentation registers can be loaded from, or stored to, main memory.

Figure 8B:
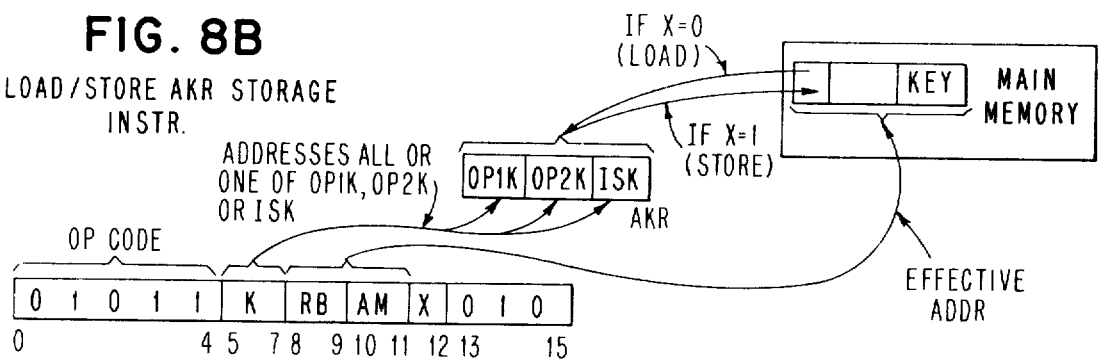

FIG. 8B illustrates diagramatically the operation of the load/store AKR storage instruction, in which the AKR can be loaded from, or stored to, a word in main memory.

Figure 8C:
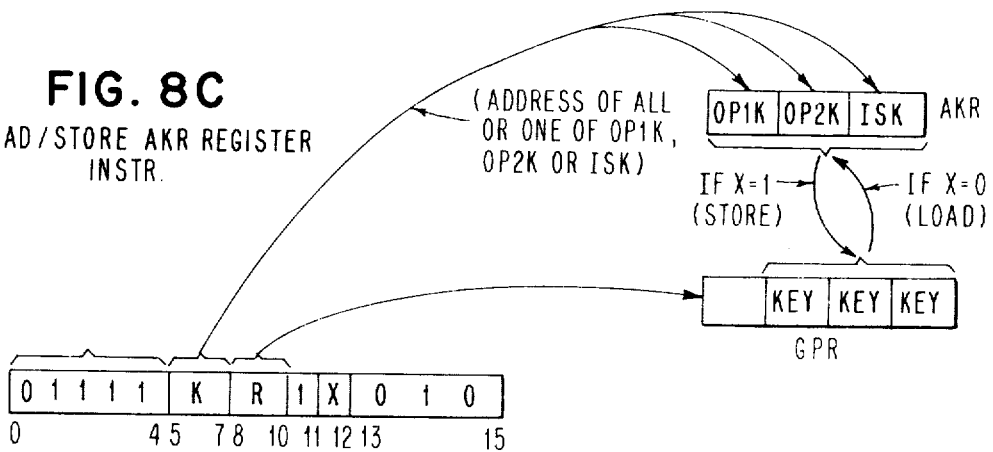

FIG. 8C illustrates diagramatically the load/store AKR register instruction which can load or store the AKR from or to a general purpose register (GPR).

Figures 1, 1A:
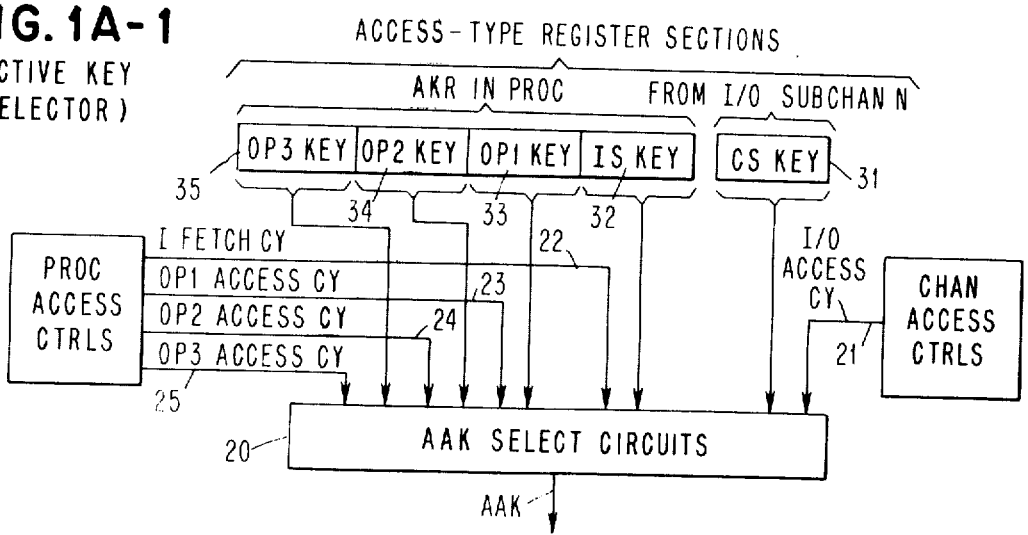
FIG. 1B illustrates diagramatically a plurality of machine identifiable storage access types which can be implemented in the invention.
FIG. 1C is a physical representation of a data processing system containing a unique expandable physical main memory, which can be operated with one or more types of addressability protection.
Figures 1, 1A, 2:
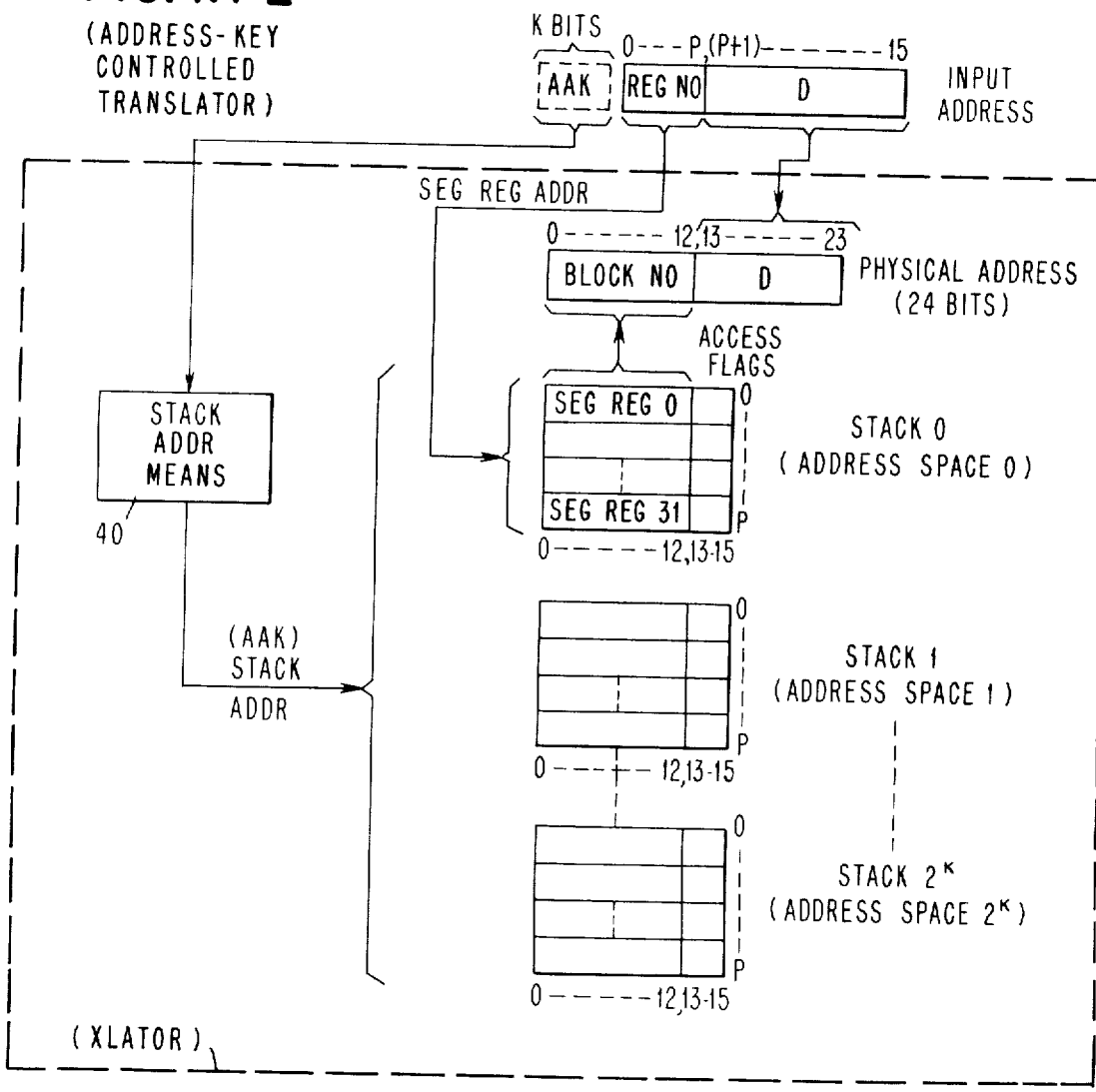
Figure 1C:
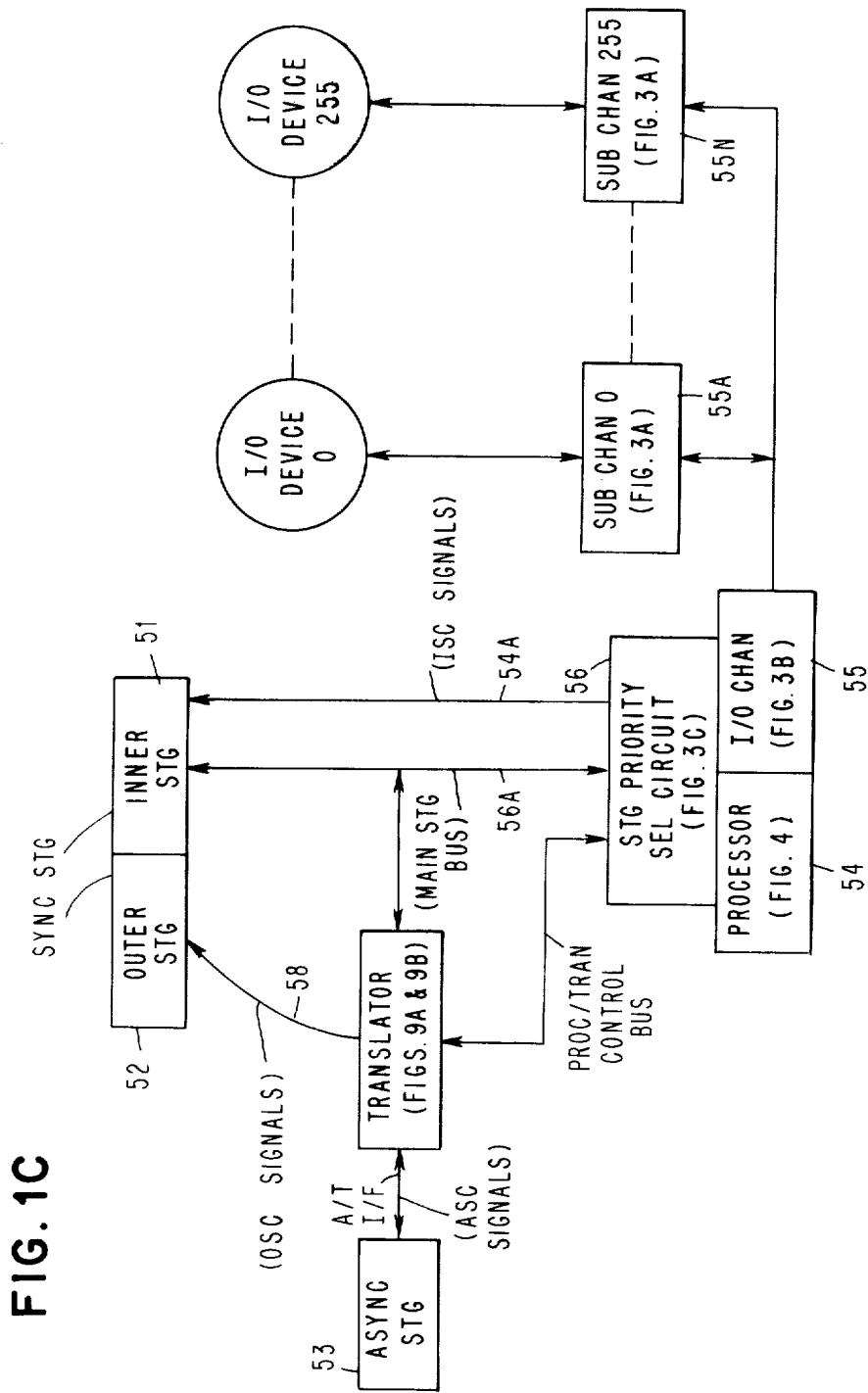
Figure 9B:
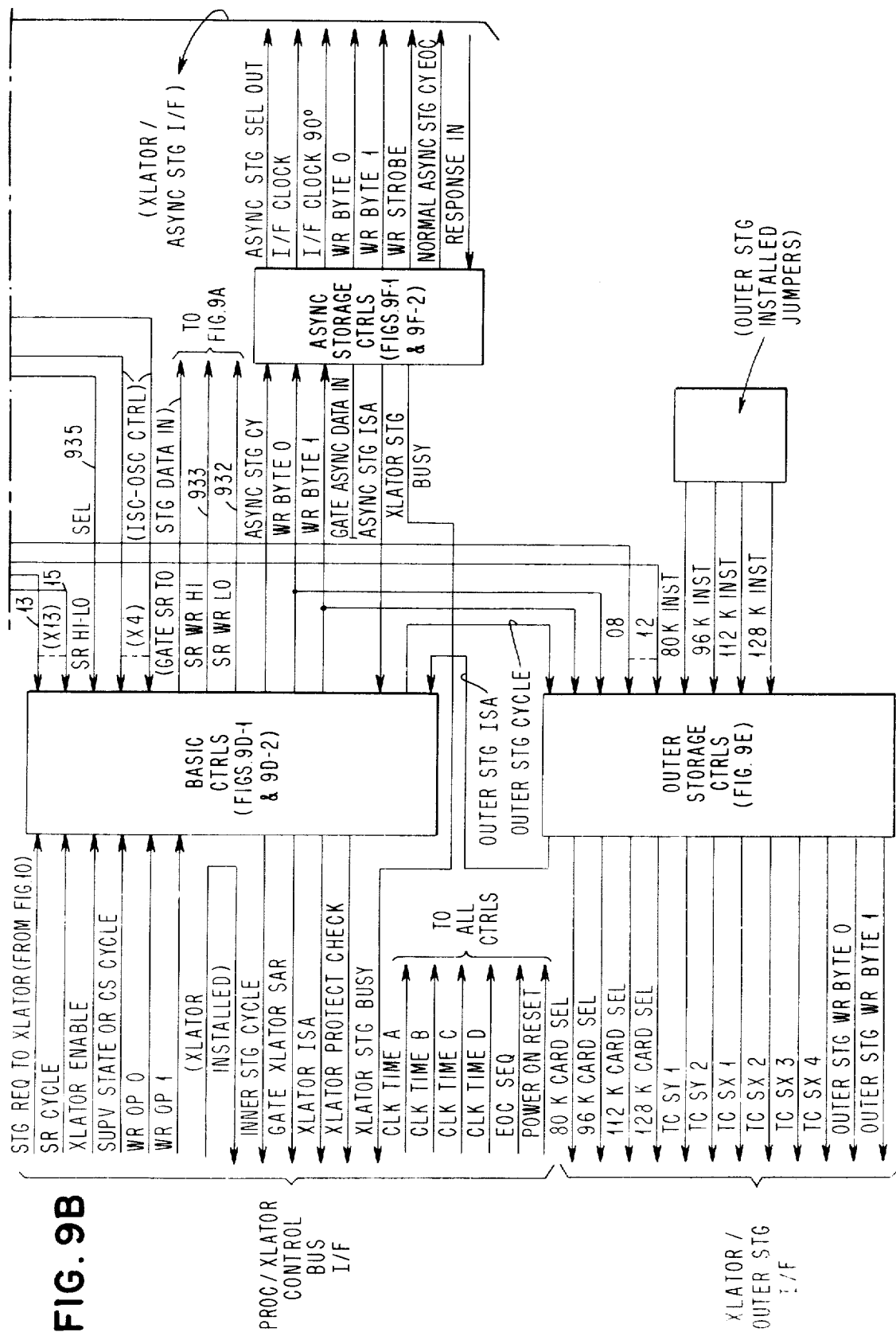
Figure 9E:
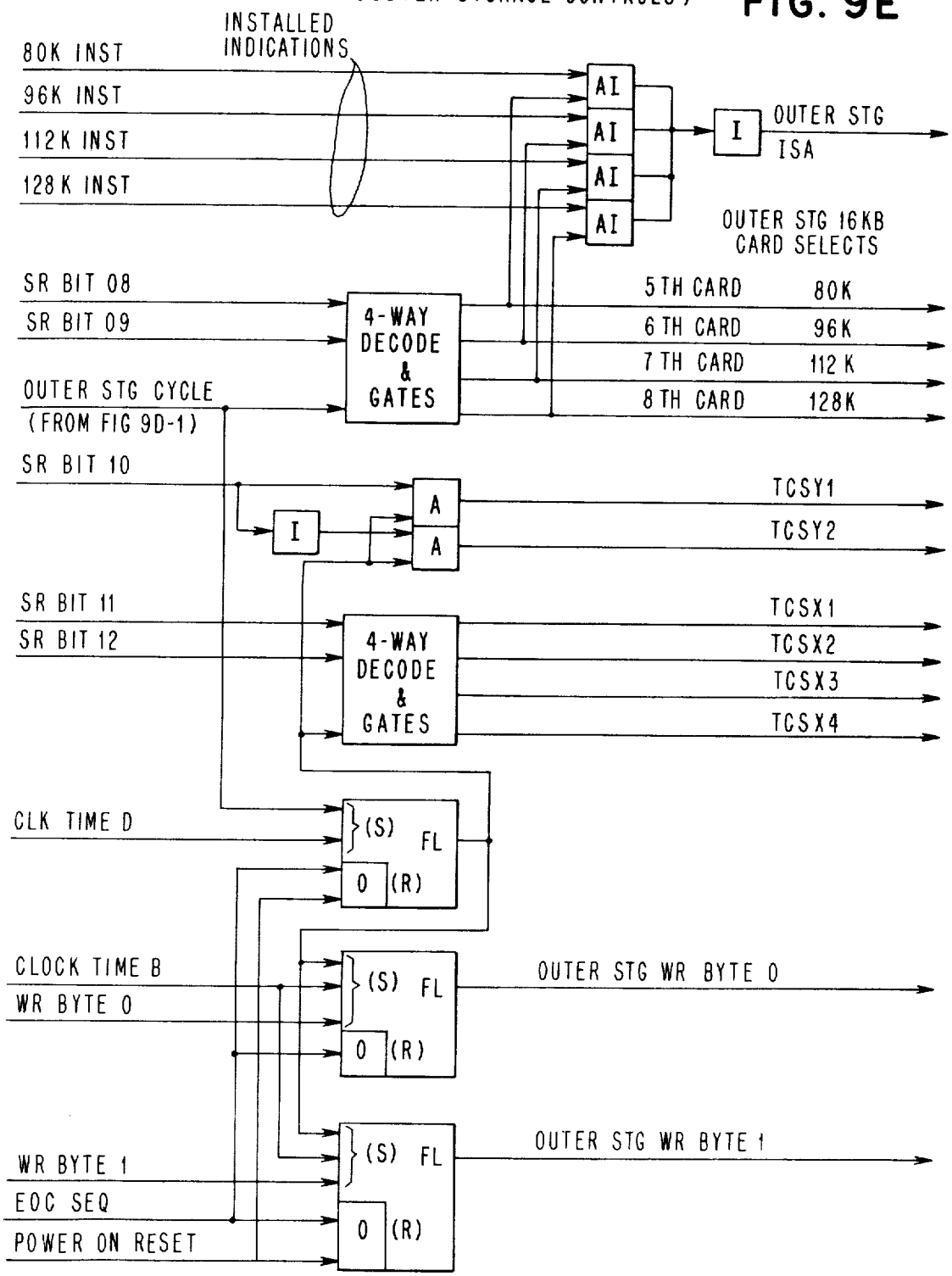

FIGS. 9A and 9B illustrate in detail a preferred embodiment of the translator represented in FIG. 1C which translates a 19 bit logical machine address into a 24 bit physical address for accessing the main memory or the system.

FIG. 9C, 9D-1, 9D-2, 9E, 9F-1, and 9F-2 illustrate detailed circuits found within boxes shown in FIGS. 9A and 9B.

FIG. 9G illustrates the operation of look-ahead circuits shown in FIG. 9C in selecting one of the inner, outer or asynchronous storage units, and the interpretation of the 24 bit physical address by the selected unit during the access cycle.

FIG. 10 illustrates a processor mode control circuit used in the detailed embodiment for processor selection of either the non-translation storage protection mode or the translation storage protection mode.

FIG. 11 illustrates protect control circuits used during the non-translation processor mode.

FIG. 12 illustrates a format for a storage-to-storage type instruction which may be executed in a processor having the subject invention.

FIG. 13A shows pertinent format components of an enable/disable instruction used for enabling or disabling the special addressability modes of the processor, such as non-translation storage protect (SPO, translation storage protect (TR), and equate operand spaces (EOS) addressability control.

FIG. 13B illustrates a sequence of states for an address key register in which the EOS state is implemented when an interrupt occurs.

FIG. 14 illustrates circuitry for implementing an alternate translation protect mode for a processor, which is alternative to the AKR translation protect mode explained in connection with FIG. 1A.

FIG. 15 illustrates an alternate address-key translation technique which may be used in a processor as an alternative to the plural stack translation arrangement shown in FIG. 1A.

FIG. 16 illustrates parallel BSM accessing with plural active address keys in a multiprocessing environment.

FIG. 17 illustrates processor controls for implementing the load/store segmentation register instruction shown in FIG. 8A.

FIG. 18 illustrates AKR loading and storing operations under class interrupt conditions.

IV. INTRODUCTION TO THE PREFERRED EMBODIMENT

FIG. 1A exemplifies the general inventive concept used in the preferred embodiment shown conceptually in FIG. 1D. FIG. 1A has an address key select circuit 20 which relates a particular type of storage access request (signalled by any of lines 21, 22, 23, 24 or 25) to a related one of key register sections 31, 32, 33, 34 or 35 which respectively contain a CS key, IS key, OP1 key, OP2 key, and OP3 key. The related one of these keys is outgated as the Active Address key (AAK) by the AAK select circuits 20. The active address key controls the addressing of main memory of the system during the next memory access, i.e. fetching or storing of data in main memory. In this addressing operation, the AAK provides the high order part of the logical address used by the machine for accessing the memory.

The access request lines 21, 22, 23, 24 and 25 each signal a different type of access request, which are derived from the channels and processors capable of accessing the same main memory. These request lines are respectively labeled in FIG. 1A as I/O access, I fetch, OP1 access, OP2 access, and OP3 access. If only one access request signal occurs at any one time, then that access request signal immediately outgates its related address key register section to provide the AAK. If plural access request signals occur simultaneously, then priority circuits in the AAK select circuits 20 determine the order in which each of the simultaneous access requests outgates its related address key as the AAK. A priority order among simultaneous request signals is provided, such as a cycle steal I/O access request is granted first to outgate the CS key. The I fetch request is granted second to outgate the IS key as the AAK. The OP1 access request is granted third to outgate the OP1 key as the AAK; and the OP2 and OP3 access requests are granted in fourth and fifth order to outgate the OP2 key or OP3 key, respectively, as the AAK.

It can thereby be seen that the invention comprehends a particular relationship between types of access requests and particular key register sections.

The address key sections in a processor are grouped into an address key register (AKR), which contains: the IS key (ISK) register section which is related to each instruction fetch request to control the accessing of each instruction, and the OP1 key (OP1K) through OP3 key (OP3K) register sections which are related to different types of operand accesses required for the execution of the instructions.

Furthermore, each I/O subchannel has its respective CS key (CSK) register section. Plural I/O subchannels can also simultaneously request accesses to the main storage. Hence, CSK priority select circuits are provided to present the CSK's in a predetermined sequential order when their requests occur simultaneously.

Still further, if multi-processors access the same main memory, priority-order circuits are provided to select an order among the respecting processor's AAK outputs. FIG. 1A illustrates a processor/channel AAK system which uses a subset of the types of storage access requests which are architecturlly available in the design of a data processing system. FIG. 1B shows a greater number of different storage access types. In any particular data processing system, this invention restricts the useable storage access types to those which are machine identifiable. That is, circuitry is required within the machine which is capable of sensing each of the different types of storage access requests at the time that each access request is being made. In FIG. 1B, more access types are designated than are used in FIG. 1A. In FIG. 1B, ten storage access types are classified into three access categories: (1) instruction access, (2) operand access, and (3) the access category related to processor events. Each channel contains K number of subchannels, and each subchannel has three storage access categories: (1) command access, (2) I/O data access, and (3) the access category related to I/O events.

Each access category provides at least one storage access type.

In a given machine, the only storage access types which can be used are the types which are manifested in the machine design by an identification signal, e.g. storage request signal. Thus, the instruction access category is machine-identified by an instruction fetch request signal. The operand access category can be machine-identified by six different types of operand access types in FIG. 1B; these are sub-categorized into direct and indirect operand access types, in which the direct access sub-category includes accesses of addresses directly generated from the instruction, while the indirect access sub-category includes operands at addresses generated indirectly from the operand address in an instruction. Each sub-category has three different operand access types, which can be machine-identified as a source fetch request signal, a sink store request signal, and a sink fetch request signal. Each of these six operand types may be architected into the design of a machine, and its machine-identification signals are determinable generally from the operation code of each instruction and its field(s) occupied by operand(s). The source fetch operand type applies to data which is used as a source of an instruction execution; it is not to be changed but is only used to generate the results of instruction execution. On the other hand, the sink store operand type refers to an access which stores the results of execution of an instruction. The sink fetch operand type is a result of a prior instruction execution which result is to be accessed as the source of the current instruction execution. In many computer systems, it has been found more efficient to architect the sink store operand type and the sink fetch operand type into a single sink store/fetch operand type.

Processor event accesses are caused by the occurrence of internal processor events, such as data error, machine failure, addressing exception, etc, of which includes a long list of well known events which cause conventional processor interrupts, i.e. internal interrupts. For example, the processor event access category includes an access into an area of main memory containing an interrupt handler and other programs for handling the interrupt-related signals as well as storing the data related to the interrupt, such as logout data.

Similarly, each channel has a plurality of subchannels which perform a plurality of different types of accesses. Thus, each subchannel is categorized as having an I/O data access category which can have an I/O fetch access type and an I/O store access type. Some machine architectures find it efficient to combine into a single type of access which is an I/O fetch/store access type. The subchannel event type of access is signalled by interrupts external to the processor, i.e. external interrupts. Many different types of external interrupts are conventionally used, such as the device end interrupt, device failure interrupt, I/O data error interrupt, etc.

In summary, the subject invention comprehends providing the capability in a machine for obtaining separate addressability in main memory for each of the different types of storage accesses shown in FIG. 1B, which include the eight different storage access types available to each processor and the four different storage access types available to each subchannel. This capability for separate addressability is provided by means of a separate key register section for each of the respective storage access types designed into a machine. However, the embodiment represented in FIG. 1A uses only four different processor access types which are represented in the illustrated example of an AKR having four differennt register sections. The number of key register sections in the AKR may be expanded to whatever number of access types are required in the architecture of a machine.

Thus, whatever the number of key register sections provided in the system, the AAK select circuits match up each machine-identified access type with a corresponding AKR register section or a CS register section by outgating the selected register section when the respective access request is granted, so that the content of the selected register section becomes the active address key which the machine uses as an address component to control the addressability for that particular memory access. The address component provided by the AAK can have either (1) a direct physical address relationship in which the AAK is concatonated with the program address, together providing a physical address in main memory, or (2) a fixed predetermined storage access relationship in the main memory, such as represented in the embodiment in FIG. 11, or (3) it can have a relocatable address relationship for the key-identified storage areas while requiring program address sequencing within each area as in FIG. 15, or (4) it can have a more flexible relocatable address relationship having relocatability within the key-identified areas, such as represented in the embodiment in FIG. 1A.

The main memory input address provided by the machine in FIG. 1A is the combination of the AAK and the program apparent address. The program apparent address is the address apparent to the machine from a program being executed, such as the instruction fetch address in the instruction address register (IAR), and the operand address(es) in the instructions of the program. When a program is written, the program only handles program apparent addresses. The application programmer is cognizant of AAK operations only to the extent that he groups his operand data separately from the program. The system programmer will generally specify the processor event access areas and their contents, and the I/O programmer will generally specify the I/O command and event access areas and their contents. In FIG. 1A, the AAK component occupies K number of bit positions in the high-order part of the combined input address, and the program apparent address occupies 16 bit positions to provide a total of 16+K bit positions in the input address of the machine.

In FIG. 1A, the input address, including the AAK field, is a machine logical address which requires translation for accessing a required location in the data processing system. On the other hand, in FIG. 11 the invention comprehends using the AAK, for example, as a directly-useable restriction on the physical address, which is not translated.

IV.A. Plural Stack Translator

The translator in FIG. 1A has a plurality of segmentation register stacks 0 through $2^K$. Each address key register sections in the processor or subchannel contains at least a K bit key, which has a value that can address any one of the eight stacks. A stack addres means 40 receives the AAK and decodes the stack address to select the required stack. Then the high-order bit positions 0 through P of the program apparent component of the input address selects a segmentation register (SR) within the selected stack. The content of the bit positions 0 through 12 of the selected SR contains an assigned block number which provides bit positions 0 – 12 in the physical address of a particular physical block in the main memory, which is then accessed.

The remaining bit positions 13 – 23 of the 24 bit physical address provide the byte displacement (D) within the selected physical block, and they are the same as the byte displacement D in the input address determined by its low-order bits (PH) through 15. The access into the particular physical block is also controlled by flag bits in the remaining bit locations 13 through 15 in the selected SR. The format for any SR is shown in more detail in FIG. 6 in which the validity bit (V) position 13 indicates whether the block number content is valid. If invalid, (i.e. V=0), the contents of the selected SR cannot be used for generating a physical address, and an addressing exception interrupt is generated. Flag bit position 14 indicates whether or not the content of the addressed block may be read only or not. If bit 14 is set to 1, no write access is permitted to the block, and fetch-only accesses are permitted. Bit 15 is not used. The second word comprised of bits 16 through 31 is reserved and also is not used for the purposes of the subject embodiment.

IV.B. Extendable Main Memory

FIG. 1C illustrates a configuration of a data processing system having a novel extendable main memory for handling translated addresses. The minimum main memory contains an inner store 51 which contains up to 64K bytes of storage. The first extension is the addition of an outer store 52 which can add 64K bytes of storage to extend the main memory to 128K bytes. Then an extendable asynchronous store 53 can be added to extend the main memory to a maximum of 16, 777, 216 bytes (i.e. $2^{24}$).

A translator 59 provides the address translation and contains interfaces which enable the extendable connections of the outer store 52 and asynchronous store 53 to the main memory configuration.

A main storage bus 56A connects a processor 54 and I/O channel 55 to the main memory configuration through a storage priority select circuit 55. The main storage bus 56A is also connected to translator 59 and to the inner storage 51.

Inner storage sequential signal lines 54A connect inner storage 51 directly to storage priority select circuit 56 to transfer inner storage cycle (ISC) signals, when they represent a 16 bit non-translated physical address generated by the processor operating in non-translate mode. When the processor is in translate mode, the ISC derives its five high-order bits from the translator which comprise a card select signal (that selects a particular card from up to four cards comprising the inner storage) and CSY and CSX fields (that select a particular array on the selected card, which array contains 4,096 bits). The five high-order bits on address bus lines 00-04 are transferred from the translator to the processor for usage by the processor during an ISC. Bits 13 through 22 are provided by the processor SAR to select the particular word position on the array, and the remaining bit 23 selects a particular byte in the word when a write operation is required. The byte addressing obtained by bit 23 is only used for write operations, since read operations are addressed on a word basis (a word comprises two bytes). During a write function, the last addressing bit 23 is set to either 0 or 1 to address either the left or right byte, respectively, in a word.

When the processor operates only with the inner storage (i.e. without having the outer storage or asynchronous storage in the system), the processor only addresses the inner storage with physical 16 bit addresses directly provided on bus 54A from the SAR. The 16 bit addresses provided by the processor extend up to the physical limit of the inner storage (i.e. to 64K). Protect keys are used with the 16 bit physical addresses in this minimum configuration system in accordance with the non-translate protect circuits in FIG. 11.

The protect keys use the capability for separate addressability provided by the address-key register sections for the different storage access types. The combinations of the AAK circuits with the protect keys is also an inventive feature described in this specification. Thus, the broader invention of the active address key circuits to provide the capability of separate addressability by storage access type is separately combinable with the non-relocatable protect keys or the relocatable address keys.

If it is desired to have relocatability, which permits the main memory to be extended beyond the 64K limits of the inner storage unit, then the translator needs to be added as shown in FIG. 1C. The outer storage can then be added and connected to the translator by the outer storage sequence signal bus 58 to provide the outer storage cycle (OSC) controls shown in FIG. 9G.

The translator also permits a further extension of the main memory behond the 128K limit of the inner and outer storage units by permitting the addition of an asynchronous storage unit. The asynchronous storage unit uses the translated 24 bit address in a different way than does the outer store, as is shown by the asynchronous storage cycle (ASC) in FIG. 9G. With the ASC, bit positions 0 through 6 are used and these bit positions will contain at least one 1 bit because it takes more than 16 bits to represent a number in excess of 128K. The use of bit positions 0 through 6 distinguishes the ASC from the OSC which does not use bit positions 0 through 6; the OSC uses only bits 7 through 23. These characteristics of bit positions 0 through 6 are used in setting a pair of look ahead bits shown in FIG. 9G, which have their circuits and operation described in more detail in connection with FIGS. 9A and 9B.

The translator has a connection to main storage bus interface through which it receives the logical addresses from the processor including the active address key for translation. The translator also has interfaces connected to the outer storage and asynchronous storage units.

IV.C. Space Control In The Preferred Embodiment

FIG. 2A is a diagram which represents different storage access types controlled by the different types of processor instructions and channel commands in relation to corresponding data spaces used in the detailed embodiment. FIG. 2A includes only a subset of the access types illustrated in FIG. 1B. Thus, in FIG. 2A, an instruction fetch is done in instruction address space 60 using the ISK. Two different operand access types are shown in FIG. 2A, which are defined by the data spaces 61 and 62 which respectively use the OP1K and OP2K register sections in an address key register (AKR).

IV.C.1. Processor Space Control

FIG. 2A illustrates the storage accessing occurring with different processor instruction types. A storage-to-storage instruction fetches data in the OP1K data space 61 or the OP2K data space 62 and stores its results into the OP2K data space 62. A storage intermediate instruction obtains its data from the ISK data space 60 and stores its results into the OP2K data space 62 or into a general purpose register (GPR). A register-to-storage instruction type moves data from a GPR 63 to OP2K data space 62; while a storage-to-register instruction fetches data from the OP2K data space 62 and stores it into a GPR 63. A branch instruction fetches a target branch instruction also from the ISK address space 60.

IV.C.2. I/O Subchannel Space Control

Two different types of I/O subchannel commands are shown in FIG. 2A. One type called a direct program control (DPC) I/O command provides and I/O operation which is synchronous with the main program, i.e the main program does not continue until the I/O operation is completed, in which both the I/O command and the data access are in the OP2K address space 62.

The other type of I/O command provides the normal asynchronous type of I/O operations, generally known as cycle steal (CS) I/O operations. In the second type, the I/O program itself (i.e. the channel commands) must be located in the key=0 address space 64 in FIG. 2A, while the data accesses performed by the channel program are controlled by keys specified in the respective channel commands, so that each command (i.e. DCB) has the capability of defining a different address space 65 ... 66. That is, each I/O device has its own subchannel program in which each command is capable of depositing a different key value in an address key register section of each subchannel, so that it is possible for each subchannel to access a different address space on each command. Thus, each channel has the capability of switching its accessed data space easily whenever needed.

FIG. 2B illustrates in more detail the manner in which the I/O operations can control their address keys to define different data spaces in main memory.

In FIG. 2B, an operate I/O instruction is in the main program to initiate an I/O operation, and hence the operate I/O instruction is in the ISK data space. The OP part of the instruction indicates that it is an operate I/O instruction, and the R2 field designates a register which contents are combined with the address field, ADDR, to generate an address which directly or indirectly locates an IDCB (indirect device control block) in the OP2K address space. If indirect addressing is used, the indirect address itself resides in the OP2K space. The IDCB address is either direct or indirect depending on the setting of the I bit in the operate I/O instruction. Thus, the operate I/O instruction is in the ISK address space and the IDCB is in the OP2K address space.

The IDCB can be of two different types, (1) a CS type, or (2) a DPC type. The command code, CMD, field in the IDCB identifies whether it is to initiate a CS operation or DPC operation.

If the IDCB is a DPC type, its second word contains immediate data which is either transferred to the device addressed or received from it depending on whether the command field indicates it is an I/O read or write operation.

If the CMD field indicates the IDCB is a CS type, the second word in the IDCB contains the address of the subchannel program for the device addressed by the DA field in the IDCB. The first channel command (i.e. channel control word) called a device control block-0 (DCB-0) is located at the address in the ICDB. A field in DCB-0 called chain address locates the next subchannel control word called DCB-1, which also contains a chain address that locates the next DCB, etc., until the last DCB is indicated.

The entire channel program is therefore located in the key=0 address space in the detailed embodiment.

However, each DCB in its initial word location EA contains a key field, which is the address key for data accessed by that particular DCB. For example, DCB-0 has a key field identified as the DCB-0 key, which identifies the address space for a contiguous block of logical addresses beginning at the data address in the DCB-0 field located at EA+14. The DCB-0 key can have any key value. Similarly, the next control word DCB-1 contains a DCB-1 key, which can have any key value to define the address space for the data addressed within the DCB-1. Hence the key value in DCB-1 can be different from the key value in DCB-0, etc.

It can therefore be seen that this invention provides tremendous flexibility in address space control during operation of the I/O devices in the system. With non-translation mode protect keys, different key values can be used in the DCB's to obtin special protection for the I/O data accesses.

Furthermore, if the translation mode is being used in the system, all I/O data addresses are translated by the translator, e.g. in FIG. 1D, for each access in the same manner that processor addresses are translated.

FIG. 3A illustrates the hardware for controlling the DCB key operations. Each I/O subchannel contains a small processor-like controller for controlling the operations of a connected I/O device, which may be any type. This processor-like controller controls the handling of the DCB key by the particular I/O subchannel. The DCB key is received in a DCB key register 301 in the subchannel controller from the I/O data bus from the channel, while each DCB is being accessed in the key=0 address space.

A plurality of subchannels are generally connected to a single channel in the conventional manner. Any subchannel can communicate with the channel by conventional handshaking signals provided between subchannels and their channel. This results in a poll capture by the subchannel requesting channel service. After the poll capture, the channel data bus transmits control signals and data between the subchannel and the main memory. Thus, a signal by the poll capture controls to subchannel ROS controls 311 causes required ROS words to be inputted into a ROS data register 313 to obtain the subchannel operations necessary. One of the subchannel operations is a DCB fetch of the next address field in the current DCB from the key=0 address space. The DCB fetch field in a ROS word is detected by a ROS decoder 314, which then provides a DCB fetch control signal that activates AND gates 315(0), 315(1) and 315(2) which ingate the DCB key register 301, which is part of a register stack which receives the entire DCB. After the DCB fetch is completed, the DCB is stored in the subchannel, the DCB fetch signal is dropped, and a not DCB fetch control signal is activated which conditions the DCB key register AND circuits 316(0), 316(1), 316(2) to outgate the DCB key, which is thereby provided as the CS key for the DCB data access operations. The CS key is transmitted on the condition code bus to the channel in FIG. 3B. Then the channel transmits the CS key to the CS key bus which connects to the storage priority select circuit in FIG. 3C.

IV.C.3 Storage Priority Select Circuit

In FIG. 3C, the CS key on the channel bus is provided to a channel select circuit 331 which receives the channel buses from all channels connected to the processor and gives priority to one of the CS keys from one of the channels.

Each subchannel controller in FIG. 3B also has a plurality of control lines comprising a control bus and an I/O address bus. The I/O address bus communicates the data address derived from the DCB. The I/O control bus includes a CS request in line which signals when an address is on the I/O address bus.

The storage priority control circuit 56 receives the CS cycle request lines from each of the plural channels 1 through P connected to a processor. A particular CS key is selected by circuit 332 at any given time, and it is then provided to channel select circuit 331 which transfers the CS key of the selected subchannel to AAK select circuits 333, which also receive the processor address keys from the processor AKR buses. Under control of the storage priority cycle circuit 332, the AAK select circuits 333 select one of its received address keys at a time as the system AAK. FIG. 3D illustrates a detailed form of AAK select circuits 333.

IV.D. Preferred Processor Embodiment

The processor AKR busses connect to outputs of the AKR in FIG. 4, which illustrates in detail the pertinent parts of the system processor, which may be contending with the CS keys for a storage access. In FIG. 3C, storage priority cycle circuit 332 (which may be a conventional priority circuit) determines the order in which the accesses are granted among the contending requests, and therefore the order in which the respectively inputted address keys becomes the AAK output of the AAK select circuits in FIG. 3D.

FIG. 4 illustrates the controls in the processor which operate its AKR. Thus, the content of the AKR is loaded from the processor data path bus on the ingate (IG) controls, and the respective address keys are outgated to the processor data path bus by outgates (OG) controls. The IG and OG control signals are generated by the processor ROS decoder. The content of the AKR is continuously outputted to the processor AKR busses, ISK bus, OP2K bus, OP1K bus and EOS bus, which are inputted to the AAK select circuits 333 in FIG. 3C, which is shown in detail in FIG. 3D. The AAK select circuits perform the selection among these three processor keys in conjunction with any presented CS key to determine which particular one of the keys will become the AAK.

FIG. 7 illustrates in detail the AKR control circuitry by illustrating the ingate and outgate circuits with a single bit position in the AKR. Each of the other AKR bit positions has similar control circuits.

It is therefore seen in FIG. 4 that the processor ROS decoder 405 has output lines which are activated by particular ROS words in the ROS data register 406 for controlling the ingating and outgatting of the AAKR register sections, ISK, OP1K, and OP2K, as well as other processor operations.

IV.D.1. Last AAK Register

The processor in FIG. 4 also contains a last active address key register which is ingated by an AAK ingate 407, which receives the AAK bus output from FIG. 3D and receives another input which is the inverted signal from a processor error latch 401. The output of the AAK IG 407 is inputted into a last AAK register 408 during a processor storage cycle from FIG. 17. Register 408 operates to store each AAK provided on the AAK bus from the processor AKR, as long as error latch 401 indicates no error on an error disabling signal line.

However, on the occurrence of a machine check (MCK) or a program check (PCK) error in the processor, error latch 401 is set. This causes a deactivation of the AAK IG 407 due to droping the error disabling signal to require retention of the last processor AAK (i.e. LKSA) existing at the time of the error until latch 401 is reset. The machine check (MCK) and program check (PCK) signal inputs are provided to a forces address decoder 402, (except during a segmentation register cycle) to force a ROS address to the ROS control 403 that causes a particular diagnostic program to be initiated for handling the error condition either by retry of the erroneous function until it is corrected, or by executing a log-out operation when the error is determined to be permanent. The last AAK register 408 thereby maintains the LKSA for providing the addressability last used while error recovery operating conditions are provided in the processor, so that after the error condition is cleared, the system is able to return to the normal addressability last used.

One of the final diagnostic operations occurring before any processor state can be changed is to store the entire status of the processor in a level status block (LSB) in main memory, including the content of the AKR. Then, an OG AAKR (outgate last AAK register) signal outgates the LKSA content of the last AAK register to the processor data path and an IG OP1K signal simultaneously occurs to put the LKSA into the OP1K register section of the AKR for the diagnostic or error recovery operations. (See Section IV.H.3. herein.) When error recovery is completed, the last normal AKR value is reloaded from the LSB in memory for picking up normal operations.

IV.D.2. AKR Load/Store Instructions

FIGS. 8B and 8C illustrate the instructions for controlling: (1) the loading of address keys into the AKR from either a word in main memory or a designated GPR, or (2) the storing of address keys from the AKR into either a word in main memory or into a designated GPR. FIG. 8B illustrates the load or store AKR storage instruction operation. This single instruction can control either the loading of the AKR from the main memory or the storing of the content of the AKR into the main memory.

FIG. 8B illustrates the 16 bit format of the load/store AKR storage instruction, which is designated by its five bit OP code and its three bit modifier field in bit positions 13–15. The K field in bit positions 5–7 addresses a part or all of the AKR which is to be ingated or outgated. For example, the K values of 0, 1, 2 or 3 respectively designate the ISK register section, OP2K register section, OP1K register section, or the entire AKR which is to be used by the instruction. A main memory logical address is generated by using the RB field at bit positions 8 and 9 that designate a base register and the AM (access mode) bits 10 and 11 that designate whether a word is an appended field to instruction which contains an address field, wherein the contents of the AM field and of the RB register are combined to generate the effective address in main memory of the word which is to be either loaded or stored by execution of the instruction. Bit X at bit position 12 designates whether the instruction operation is a load or stored. If X is set to 0, the content of the addressed word is stored into the AKR portion designated by the K field. If the X bit is set to 1, then the designated AKR portion is stored into the addressed word.

Similarly, FIG. 8C describes the operations for the load/store AKR register instruction, which is similar to the AKR storage instruction in FIG. 8B except that a GPR is substituted for the main store word in the execution of the register instruction. Thus, in FIG. 8C, the R field at bit positions 8–10 designates a particular GPR which either loads or stores one or more keys into the designated part(s) of the AKR.

These respective operations are executed in the processor by signals on the respectively labeled IG and OG output lines of the processor ROS decoder 405 in FIG. 4 which actuate signals on the data path in the processor to perform the operations described in connection with FIG. 8B.

IV.E Preferred Translator Embodiment

FIGS. 9A and 9B illustrate in detail the circuitry in translator 9 in FIG. 1C which performs the relocation translation operations described for FIG. 1A. This relocation translator circuitry is capable of extending the physical addressability from 64K ($2^{16}$) bytes to 16 million ($2^{24}$) bytes, which is an extension of an inner store containing 64K bytes.

The translator increases the addressability of the main memory by interpreting the AAK and the 16 bit program-apparent-address from either a processor or a subchannel as a logical input address to the translator, which translates it to a 24 bit physical address which accesses the inner, outer, or asynchronous store components.

The translation allows dynamic allocation of physical storage to logical address spaces and the sharing of physical storage among logical address spaces. Eight sets of 32 segmentation registers (SRs) exit for the respective eight values available for the address keys for a total of 256 segmentation registers. Once loaded, each SR stack can contain a complete map of a storage space having up to 64K bytes, which may be scattered in 2K byte blocks of physical memory. A stack can address a space having less than 64K bytes by merely setting the invalid bit in one or more of its SR's so that only the SRs having their invalid bits off designate the 2K blocks comprising the addressable identified by an assigned address key.

A separate stack of segmentation registers are provided for each address key to allow fast switching of logical address spaces without the need for saving and restoring the address space storage map of the system.

The relocation translator in FIGS. 9A and 9B supports an extension of the main memory by an outer storage of up to 64KB in increments of 16KB cards which are designated as the fifth through eighth cards for the outer store. The inner store will contain the first through fourth cards, each likewise having the 16KB storage capacity. Storage increments beyond the 128KB capacity of the inner and outer storage require the addition of the asynchronous storage unit in FIG. 1C, which provides addresses above 128KB that may extend up to a maximum of 16 million bytes of physical memory.

The maximum static machine addressability available to all concurrent programs when all segmentation registers are loaded with a different physical block address is 19K bytes, which is determined by the 19 bit input address seen in FIG. 1A when the 3 bit AAK is appended to the 16 bit program apparent address to provide the 19 bit machine logical input address to the translator. A single program can have an addressability of from one to three different address spaces defined in the three sections of the AKR, e.g. ISK, OP1K, and OP2K, for a total static addressability of from 64K to 192K bytes.

Thus, for a physical main store between 512K and 16M bytes, only up to 512K bytes can be addressed at any given loading of the segmentation registers; this is defined as the maximum static machine addressability. Therefore, addressing beyong the 512K byte static maximum requires reloading of the segmentation registers by software to gain addressability to other areas in the main store which may be loaded.

The static addressability can easily be extended by adding more bits to the size of the address key in the AKR and associated circuits to support a correspondingly greater number of segmentation register stacks.

When a translator is installed in the system as shown in FIG. 1A, its use is controlled by a bit 14 in the processor status word (PSW) which is controlled by output lines of the processor ROS decoder in FIG. 4 under control of the enable/disable instruction illustrated in FIG. 13A. Bit 14 in the enable/disable instruction indicates whether or not the translator is selected in the system and bit 7 indicates whether it is to be enabled or disabled. The circuit is FIG. 10 controls whether the translator is enabled or not. If the translator is not enabled, and if the SP bit is on in the instruction illustrated in FIG. 13A, the non-translatable storage protection control circuit shown in FIG. 11 used. Where only small addressability and fastest processing speed are needed, the translator may be disabled.

FIGS. 9A and 9B illustrate in detail the circuits, buses, and interface lines in translator 59 in the system in FIG. 1C, as follows:

IV.E.I. Processor/Translator Interface

1. Storage address bus 901. It has 15 lines that connect the program logical address in the processor storage address register (SAR) to the translator. After address translation, the translated five most significant bits are sent back to the processor for usage in addressing inner storage 51 as necessary. The ten last significant bits (D field bits) do not require translation.
2. Storage data bus 902 to storage. It includes 16 data lines plus two parity lines. It transfers storage data and segmentation register contents from the processor to the translator.
3. Storage data bus 903 from storage. It includes 16 data lines plus two parity lines. It transfers storage data from the translator and the content of the segmentation registers (SRs) to the processor.
4. Active address key (AAK) bus. These three lines transfer the AAK from the storage priority select circuit in FIG. 3C to the translator for selecting the particular SR stack in the translator.
5. Storage write OP 0. A single line from the processor that signals the translator that a write operation is to occur in the memory to the left-most byte of the word of data currently on the storage data but to storage. This line is controlled by the zero state of the lowest-order bit 23 in the 24 bit physical address.
6. Storage write OP 1. A single line from the processor to the translator to signal that a write operation in memory is to be performed in the right-most byte of the current word on the storage data but to storage. This signal is also controlled by the one state of the lowest-order bit 23 in the 24 bit physical address.
7. Translator enable. A single line which transmits a processor signal to the translator to enable the translator for performing its translate functions. It is controlled by the enabled/disable instruction.
8. Storage request to translator. This single line communicates a processor signal which requests the translator to translate the logical address on the storage address bus. One micro cycle (220 nanoseconds) is automatically skipped to let the translator access the appropriate segmentation register, obtain the physical address, and determine whether a reference should be made to the inner, outer, or asynchronous storage.
9. Timing pulses A, B, C, and D. These four lines transmit processor timing pulses of 55 NS which provide synchronism between the processor and translator.
10. Gate translator SAR. This line signals that the translator has placed the five most significant bits of the translated physical storage address on the storage address bus 55NS after this signal is activated. It indicates to the processor that it should gate address bus bits 00-04 of the translated address to the inner storage unit.
11. Inner Storage cycle (ISC). This line provides a translator generated signal which alerts the processor to provide storage sequencing signals to the inner storage 51 which each new physical address. If an outer or asynchronous storage cycle (OSC or ASC) is to be used, this line is made inactive, so that inner storage is not selected.
12. Translator storage busy. This line carries a translator generated signal which indicates to the processor to stop its clock. This line is activated only on references to the asynchronous storage unit 53. When the translator has obtained the appropriate response from the asynchronous storage unit 53, this line is deactivated, and the clock starts again to complete the storage cycle. This stopping of the storage clock by an asynchronous storage unit operation is what makes its operations asynchronous and its access cycle longer than the access cycle in either the outer or inner storage units 51 or 52.
13. Translator Installed. This line carries a translator generator signal which informs the processor that translator 59 has been installed in the system.
14. Translator ISA (invalid storage address). This line carries a translator generated signal to the processor that informs it that the current logical address issued to the translator is invalid, and a program check (PCK) then occurs.
15. Translator protect check. This line carries a translator generated signal to the processor that indicates that an attempt has beem made to write storage in the problem state in a block having its segmentation registers read only bit 14 set to 1 which indicates the read only state is permitted.

16. Supervisor state or Cycle Steal cycle. This line carries a processor generated signal to the translator that it should ignore the read only bit 14 in the addressed segmentation register, because the current storage access request is by either the supervisor or an I/O subchannel.

17. EOC (end of cycle) sequence. This line carries a processor generated signal which informs the translator that it is finishing its storage cycle.

18. Segmentation register cycle. This line carries a processor generated signal which alerts the translator that the segmentation registers will be activated. The storage write OP 0 and storage OP 1 lines are used also to indicate whether the cycle is a read or write cycle as part of a store segment register instruction or a load segment register instruction, respectively.

IV.E.2. Translator/Outer Storage Interface

The translator (XLATOR) to outer storage unit interface in FIG. 9B and includes the following lines:

1. Card Select lines. These four lines are respectively identified as the 80K, 96K, 112K and 128K card select lines to select a 16K byte card in the outer store.
2. TCSX, and TCSY lines. These six lines signal the X and Y Y coordinates on the selected card to select a particular array on the card.
3. Write Byte 0 and Write Byte 1 lines. These lines are write strobes to the four outer storage cards for writing a byte.

The translator, upon obtaining the physical storage address from the appropriate segmentation register, determines whether a reference is to be made to the inner, outer or asynchronous storage and will sequence the Xlator/outer storage I/F lines only if an outer storage cycle is indicated. The jumpers installed with the outer storage controls in FIG. 9B indicate which of the four cards are installed in the outer storage unit.

IV.E.3. Translator/Asynchronous Storage Interface

The lines in the translator (XLATOR) to asynchronous storage interface in FIGS. 9A and 9B are as follows:

1. Asynch Storage Parity/Data Out. These 16 data lines and two parity lines comprise the storage data bus to the asynch storage unit.
2. Asynch Storage Parity/Data In. These 16 data lines and two parity lines comprise the storage data bus from the asynchronous storage unit to the processor and channel.
3. Asynch Storage Lower SAR Out. These 13 lines carry the 13 most significant bits in the physical address which comprise the block address in the asynchronous storage unit. They comprise the upper SAR bits 0–12 shown in the asynch storage cycle in FIG. 9G.
4. Asynch Storage Upper SAR out. These 10 lines carry the 10 least significant bits 13–22 in the ASC, but not bit 23 in the SC in FIG. 9G. Bits 13–22 address a word in the select block.
5. Write Byte 0. This line carries the lowest bit position 23 in the physical address to indicate whether the left most byte in the addressed word is to be a store operation during the asynchronous storage cycle.
6. Write Byte 1. This line informs the asynchronous store that the right most byte in the currently addressed word is to have a store operation during the asynchronous storage cycle.
7. Asynch Storage Select Out. This line indicates to the addressed storage module to begin a storage cycle. This select out line is only activated during an asynchronous storage cycle and when no logical instruction storage address or protect check has been detected by the translator.
8. I/F Clock and I/F Clock 90°. These two identified clock cycles have a 440 NS period with a 50% duty cycle. These clock cycles are 90° out of phase with each other and are only active while the select out line is active. These clock cycles may be used by the asynchronous storage unit for timing within the unit, for resolving refresh contention, for latching data, and for generating responses at the appropriate times.
9. Response In. This line receives a signal from the asynchronous storage unit that the addressed location is installed.
10. Write Strobe. This line is activated during the later part of a write cycle to the selected asynchronous storage module, after response in signal is received by the translator. The write strobe line is activated only while the selected out line is activated.
11. Normal Asynch Storage EOC (end of cycle). This line provides a strobe pulse if the response in line receives a signal from the asynchronous store. It is used as an acknowledgement by the selected asynchronous store to accomplish resetting of any latches set up during the cycle and to prevent reselection during the same cycle during the fall of the select out signal.

IV.E.4. Segmentation Register Selection

The segmentation register control circuits are shown in detail in FIG. 9C. A SR is selected by a funneling technique. First, the required register position is selected in all stacks by addressing all registers with the high-order bits 0–4 in the program apparent logical address, so that the selected register in each stack are the outputs of the eight stacks. Then the AAK bits are used to stack select among the selected registers being outputted from the eight stacks to narrow the selection to the particular register required. This is done by first applying the state of AAK bit 2 among the selected SR's to narrow the selection to four SR's, either from the odd or even stacks. The AAK bit 1 true (T) and complement (C) lines are then applied to select one of two groups of stack outputs which will be either the outputs of stacks 0,1 and 4,5 or of stacks 2,3 and 6,7. (The comma (,) means "or" between its stack numbers in this notation.) Thus, a pair of registers will be outputted, which will be from either stacks 0,1 and 4,5 if AAK bit 1 has state 0, or the pair will be from stacks 2,3 and 6,7 if AAK bit 1 has state 1. The resultant pair is further narrowed to a single register by the state of the SR hi-low select bit (AAK bit O) applied to two-way funnel 921 in FIG. 9A which selects between the selected pair of stacks to out only a single stack which provides the selected remaining register. which is the required register.

IV.E.5. Segmentation Register Load/Store Controls

FIG. 8A illustrates the operation of the load/store segmentation register (SR) instructions. FIG. 17 illustrates processor storage controls and FIGS. 9A and 9B contains the pertinent translator controls used in executing these instructions.

In FIG. 8A, the load SR instruction controls the setting of a physical block address into a selected SR from an addressed word in main memory. The store SR instruction controls the copying of the content of a selected SR into an addressed word in main memory.

The 16 bit format of each load/store segmentation register instruction is designated by a five bit OP code and a three bit modifier field in bit positions 0–4 and 13–15, respectively.

Bit X at bit position 12 in the SR instruction designates whether the instruction operation is a load or store. If X is set to 0, the content of the addressed word in memory is loaded into the selected segmentation register. If the X bit is set to 1, then the selected segmentation register has its contents stored into the addressed word.

The R field in bit positions 5–7 addresses a general purpose register (GPR) which contains the address of the selected segmentation register to be loaded or stored. In the GPR, the key field in bit positions 5–7 is a stack number which identifies the selected stack, and GPR bit positions 0–4 contains a segmentation register number which identifies the selected SR which is to be loaded or stored.

The addressed word in main memory is located by a logical address generated by using the RB field at bit positions 8 and 9 that designate a base register, and the AM (access mode) field in bits 10 and 11 designate whether an AM word is to follow the instruction. The contents of the Am word (if any) and of the RB register are combined to generate the effective address (i.e. program apparent address) of the main memory word which is to be either load or stored by execution of the instruction. If the system is in translate mode, the generated effective address is inputted to the translator in FIGS. 9A and 9B along with the AAK to comprise an input logical machine address. The translator outputs the 24 bit physical address for accessing the addressed memory word. Thus it is possible for the SR which is to be loaded to have its content used in a translation operation before the SR load instruction changes its content to a different physical block address.

If the processor is not in translate mode, the generated effective address is the physical address in main memory.

Bits 13 and 14 in the addressed word in main memory contain the settings of the valid bit V and read-only bit R to be loaded into the SR to control its operation whenever used for a requested translation.

FIG. 17 illustrates processor storage controls used in executing the load/store segmentation register instructions. These controls in the processor generate a segmentation register cycle which is used by the translator in FIGS. 9A and 9B to perform a SR load or store. A load/store segmentation register instruction accesses microcode in the processor which generates a L/S segmentation register request signal followed by a signal for a processor request for a storage cycle. The first signal sets a SR request next latch 481 in FIG. 17, and second record signal is received by an AND gate 482 while it is being conditioned by the true (T) output of latch 481. A SR phase latch (PH) is set for a cycle by activation of AND gate 482 to activate AND gate 484 when the translator is installed. The output of AND gate 484 sets a SR request latch 486 to indicate that a segmentation register needs to be accessed. The true output (T) of latch 486 then enables an AND gate 488 to provide a SR cycle, provided that no CS cycle request exists, since CS cycles get highest priority. The SR cycle gets second highest priority, and a normal processor storage cycle gets lowest priority by means of AND gate 493 that generates a processor storage cycle signal on line 494 only when no SR request signal is inputted to it from the complement (C) output of latch 486. The other input of AND gate 493 is connected to the true (T) output of the processor cycle latch.

When AND gate 488 is enabled by the true (T) output of latch 486 during the execution of a SR load or store instruction, its other input is received the true (T) output signal from a processor cycle latch 490 which is actuated whenever there is a storage request by the processor. Thus, latch 490 is set by an output from an AND circuit 491 which has one input conditioned by a not cycle steal (CS) cycle signal (which occurs while there is no I/O storage access request pending). The other input of AND gate 491 is conditioned by the true output of a processor storage request latch 492 which is set whenever there is a processor request for a storage cycle.

During the existence of the SR cycle signal on line 923, the SR to be selected is addressed by the current address in the processor SAR. Then the SR selection operation occurs in the manner described in the discussion of the translator in the section herein entitled "Segmentation Register Selection".

As previously mentioned, whether a load or store operation occurs depends on the setting of the X bit in the instruction; to do this, the X bit selects a load or store microroutine from the processor ROS. For a SR load, the microroutine will first generate a processor storage request during which the SR instruction addressed word in main memory is fetched and put into the processor SDR. Then the microroutine issues the L/S SR request signal followed by another processor request for a storage cycle, which causes the circuit in FIG. 17 to operate as explained above to generate a SR cycle which selects the SR and causes the SDR content to be moved into the selected SR.

The store SR instruction operates similarly but with a reverse microroutine sequence. That is, it first actuates the circuit in FIG. 17 to generate a SR cycle during which the SR is selected and its content moved into the SDR. Then the microroutine issues a normal processor storage request which causes the SDR content to be moved into the addressed location in the main memory.

IV.E6. Look Ahead Translator Unit controls

The address translation operation uses one processor clock cycle of access time for selecting and reading out a segmentation register (SR), when generating the block address part of the physical address from bits 0–4 of the logical address. Another processor clock cycle of access time would be needed. if it were not for the lookahead feature, for decoding the read-out block address, in order to select the interface bus to the required one of the memory units, i.e. inner store, outer store, or asynchronous store, to which the physical block address must be transmitted. The lookahead feature eliminates the need for any extra time for selecting the required interface bus, and eliminates the need for decoding the read-out block address to determine the required storage unit. Hence, it reduces the translated access time by a processor clock cycle. During the translation operation, the D bits in positions 5–15 of the logical address are being continuously provided on the main storage bus from the processor SAR, and hence the D bits do not add any extra time to the translation operation; they are simultaneously applied to all three storage units.

The lookahead feature provides two bit positions labeled lookahead bits, with each segmentation register (SR) in each of the eight stacks in FIG. 9A. Each SR is constructed as shown in FIG. 6. The lookahead two bits are generated and set into an SR at the time a block number is loaded into the segment register by the processor storage controls shown in FIG. 17, which perform the operations shown in FIG. 8A. The lookahead bits indicate which one of the inner, outer or asynchronous storage unit contains the block corresponding to the block number in the SR. After the lookahead bits are set and the SR's are loaded the lookahead bits are used with each translated storage access to permit the required storage unit to be determined and selected in parallel with the hardware translation of the input logical address. The block number, but not the lookahead bits, are redable by a program using an SR store instruction.

The lookahead bits are coded in the manner shown in FIG. 9G. The left lookahead bit is set to 1 if the assigned block is in the inner storage unit. If the left bit is set to 0, the assigned block is in either the outer storage or asynchronous storage unit. The setting of the right lookahead bit indicates whether outer or asynchronous storage units contains the block. If the right bit is 0, the block is in the asynchronous storage unit.

The lookahead bits are used only by the hardware and are not seen by the programmer or system user. They exist only for the purpose of speeding up the memory access and are not part of the translation operation.

The hardware for setting the lookahead bits is found in FIG. 9C. It includes decoders 901 and 902, both of which receive the high order portion of the assigned block number being loaded into an SR by execution of a segment register instruction in the manner described for FIG. 8A. The selected SR is in one of the stacks 0-7 in FIG. 9C. The block number is provided by the load segmentation register instruction, which accesses the program assigned block number from the storage word in main memory addressed by the instruction, which block number is put into the SDR in FIG. 4. Then the processor provides the assigned block number from the SDR to the processor data bus, which in FIG. 3C connects to the storage data bus to storage in FIG. 9A which provides the SR input to be loaded into any addressed segment register in stacks 0-7. The SR load path is shown in detail in FIG. 9C in which the SR input lines 00-07 are used to generate the lookahead bit signals. Lines 00-06 are connected to the input of the all zeros decoder 902, and lines 00-07 are connected to the input of the all-zeros decoder 901. Each all-zeros decoder will output a 1 state lookahead signal if it receives all zeros, and it outputs a 0-state signal if any input is a one. Thus, if decoder 901 senses all zeros in bit positions 00-07, it outputs a 1 bit into the left-most lookahead bit position for the addressed SR in the stacks; but if any of input bits 0-7 contains a 1, then the left-most lookahead bit is set to 0. Decoder 901 indicates if the physical block whose address is being loaded is located in the inner storage unit or not, which determines if an ISC signal is to be provided.

If decoder 902 senses all zeroes in SR input bit positions 0-6, then the right lookahead bit of the addressed SR is set to one. The rational is that if the left lookahead bit indicates that the inner storage unit is not the pertinent unit, and if bits 0-6 are all zeros, then decoder 902 indicates whether or not a 1 bit exists in bit position 7 of the physical address to be loaded, which indicates whether the assigned block is in the outer storage unit, or is in the asynchronous storage unit.

Accordingly, any SR being loaded has its lookahead bits set to indicate the particular storage unit containing its assigned block.

The SR load operation occurs during an SR cycle, which is signalled on line 923 to funnel 922 in FIG. 9A from the basic controls shown in detail in FIG. 9D-2.

The stack address is inputted to funnel 922 on lines 05-07 of the storage address bus 901 in FIG. 9A. The SR register address is provided on lines 00-04 of the storage address bus 901 through the PH register to the SR stacks 0-7 in FIG. 9A. These address signals are put on lines 00-07 of storage address bus 901 from FIG. 3C which receives the processor address bus from the SAR in FIG. 4. The SAR receives its content from the GPR selected by the load SR instruction in FIG. 8A, in which GPR bits 0-7 are the SR address bits on lines 00-07 of bus 901. (The GPR is selected in level stack 431 in FIG. 4 by a level stack address developed from the GPR field in the load SR instruction.)

Funnel 922 then outputs the stack address of the selected SR on its output lines, AAK bit 2, AAK bit 1, and SR hi-lo select line 935. Line 935 provides an input to basic controls in FIG. 9B. These circuits are shown in detail in FIG. 9D-2, which generate the signals on lines 932 and 933 which are connected to the segmentation register stacks 0-7 as the lowest-order stack address bit, which also corresponds to the true and complement form of the signal on line 07 of storage address bus 901. The signals on the AAK bit 1 lines correspond to the true and complement form of the signals on bus lines 06; and the signal on the AAK bit 2 line corresponds to the signal on bus line 05.

On a memory access in translate mode, a stack register is selected by the same type of funneling described in the section entitled "Segmentation Register Selection." The funnel selected SRs each have their two lookahead bits read out at the same time that their other 16 bits are read out. The lookahead bits use the separate funnel 931 because it operates faster than the wider funnel 921 which selects the block address bits for the same SR. The output of 931 is a selected one of three output lines which signal a selected storage cycle, an ISC, OSC or ASC. The processor uses the ISC signal lines 54A from the processor through the storage priority select circuits 56 to the inner storage unit 51 in FIG. 1C. Since lines 54A exist whether or not the system has a translator, the inner storage cycle control line of funnel 931 is connected to the processor to actuate an ISC addressing operation. The outer storage cycle and asynchronous storage cycle lines go to FIGS. 9E and 9F-1, respectively, to control the address selection in their respective units.

IV.F. Equate Operand Spaces Feature

A feature is provided called the equate operand spaces (EOS) feature which provides a state that is set into the AKR to control a special addressability condition, in which all operand fetches are forced to occur within the OP2K address space, and the address space defined by the OP1K address key is ignored even though the key in the OP1K register section of the AKR is not changed.

The EOS state of the system is enabled by the enable instruction shown in FIG. 13A when its EOS bit 13 is set. When this instruction is executed, the set EOS bit causes the EOS register section in the respective AKR to be correspondingly set by being ingated from the processor ROS decoder in FIG. 4. None of the key settings in the AKR is changed when the EOS state is activated. However, the address space defined in the OP1K section will not be accessed as long as the EOS state is on in the AKR. The hardware arrangement in FIG. 3D implements the EOS feature, in which activation of the EOS line from the AKR forces the AAK to output the OP2K key whenever there is an access request for either an OP1 or OP2 operand caused by by the execution of an instruction in the processor.

Whenever the EOS state is disabled by execution of a disable instruction having its EOS bit 13 set off, the key value in the OP1K register section becomes operational again and is accessed by any OP1 operand request.

IV.G. Address Space Management By Key Settings in AKR

When the EOS feature is disabled, the function of the three address keys in the AKR is as follows:

Each address key loaded in the AKR defines an accessable address space. Each address space is a range of logically continuous storage accessable by the effective logical address without intervention by any programmed resource management function. Each logical address space contains up to 64K bytes. All instruction fetches will occur within the address space defined by the ISK. All reads concerning data operand 1 (as defined in the storage-to-storage instruction architecture) will occur in the address space defined by the OP1K. (By architectural definition, no writes occur for operand 1.) Likewise, all reads and writes concerning data operand 2 (as defined in each instruction's architecture) will occur in the address space defined by the OP2K.

For example, if ISK=OP1K=OP2K, the machine will execute with all storage accesses within the same address 64K logical address space. If ISK is not equal to OP1K but OP1K=OP2K, the machine will operate with instruction fetches occurring in the ISK address space and data accesses occurring in the OP2 address space. If ISK ≠OP1K≠OP2K, then instruction fetch occurs in the ISK address space, each operand 1 fetch occurs in the OP1K space, and each operand 2 fetch or store occurs in the OP2K address space, wherein the three spaces are different. The data flow for classes of instruction in which three address spaces are different is illustrated in FIG. 2A.

The values of the keys in the AKR can only be set when the processor is in supervisor mode, i.e. the load AKR instructions are privileged.

IV.H AKR Loading Under Interrupt Conditions

When interrupts occur to the processor, the values of the address keys in the AKR are set in anticipation of address spaces which may be required by the interrupt handling programming support. There are a plurality of different types of interrupts in the system, each of which may have its special programming support which may require a particular loading of address keys. Processor interrupts include supervisor call interrupts, I/O device interrupts, machine check/program check interrupts, program trace interrupts, console interrupts and power thermal warning interrupts. These processor interrupts are sometimes called class interrupts.

All interrupt routines are presumed to reside in the address space with key=0; therefore, the ISK must be loaded with 0 when an interrupt occurs. Since operand data necessary for handling a specific interrupt may reside in another address space, the address key relevant to the particular interrupt data may be loaded into the OP1K register section. The time when the OP1K key is set is when a class interrupt occurs (i.e. inputs to the forced addressing circuit 402 in FIG. 4) in anticipation of performing a storage-to-storage move of relative information from the interrupting address space (i.e. OP1K space) to OP2K address space with key=0. For example, when a class interrupt occurs, a level status block (LSB) is stored into the OP2K space having key=0 (i.e. OP2K=0) using fetches of data from the OP1K space. The AKR content is also stored into the LSB with a store AKR instruction.

Other circumstances in which all key values in the AKR are set to zero are: system reset, and initial program load, during which the EOS, translator, and storage protect features are all disabled.

IV.H.1. SVC Interrupt

The SVC interrupt operations discussed below assume that the supervisor programs are in the key=0 address space and that the user program is in some other address space, i.e. key≠0. It is also assumed that a communication of data is required between the user and the supervisor. The data must be obtained from the user's address space to the supervisor's address space, and transferred back to the user's address space.

FIG. 13B illustrates loading operations for the AKR under a supervisor call (SVC) interrupt condition. It is assumed during the initial user state that each of the three user keys is set to a key value of 2, and that the EOS field is set to zero. When a supervisor call instruction is executed in the processor of FIG. 4, forced address circuit causes a sequence of ROS words to be fetched and executed which causes the processor to be put in supervisory state. Also an LSB is stored, the contents of OP2K are outgated to the contents of OP1K, providing addressability to the address space having the data involved in the generation of the interrupt, and the outgate zero (OG 0) line from the processor ROS decoder is activated to the processor data path and ingated into the OP2K and ISK positions of the AKR.

Data is passed from the user area to the supervisor area, then the enable instruction in FIG. 13A with its bit 13 on is executed to provide EOS state 4 shown in FIG. 13B. This causes all storage accesses to occur in the address space having key 0 while the supervisor program is being executed in the EOS state, without losing the addressability to the OP1K address space.

Whenever the supervisor wishes to transfer information into the OP1K area, the processor issues a disable instruction which effectively resets the EOS section of the AKR; and this restores addressability to the OP1K space. Then state 6 in FIG. 13B is provided by interchanging the OP1K and OP2K fields in order for the supervisor to obtain store addressability to the OP1K area. The supervisor may then pass the data from the supervisor area to the user area. Then the AKR is returned to the user state 7 in FIG. 13B by loading the initial AKR state from the LSB.

FIG. 18 illustrates the operations which occur whenever an SVC instruction is issued. These operations include saving the old content and loading a new content into the AKR as follows, in which the following numbered paragraphs correspond to the circle numbered paths in FIG. 18. The processor execution of the SVC instruction preceeds as follows:

1. At the beginning of execution of the SVC instruction, the AKR content is gated to the work area register (WAR) via the processor data path bus by actuation of the OG AKR signal and IG WAR signal from the ROS decoder. This operation is indicated by the move of the AKR content into the TEMPA in FIG. 18, OP1K, OP2K and ISK are each assumed to have been set to key=3.

2. Outgate OP2K and ingate OP1K.
3. Set OP2K=ISK=0.
4. The content of the LSR (level status register) is stored in the temporary register (TEMPB').
5. In the LSR', its supervisor state bit is enabled, its summary mask bit is disabled and its trace bit is disabled.
6. The IAR (instruction address register) is then incremented by two, which causes the IAR to address the next storage location, which locates the beginning of the data or a pointer to the data.
7. The processor detection of the SVC causes storage address location 0010 in address space key=0 to be fetched. This space is predefined to include an address (i.e. pointer) to a level storage block, i.e. LSB, also in the key=0 address space.
8. The LSB pointer in location 0010 is moved into the SAR in FIG. 4.
9. At the LSB storage location addressed by the SAR, the IAR, TEMPA, TEMPB, and general purpose registers 0–7 are stored into the level status block (LSB).
10. The SVC number (identifying the particular type of SVC instruction) is copied into R1 from the SVC instruction in address space 3.
11. The content of storage location 0012 is moved into the IAR.
12. Execution begins for the supervisor routine addressed from location 0012. This is the routine called for by SVC number 2.

The resulting AKR load state at the start of the SVC routine is:

| OP1K | OP2K | ISK |
|---|---|---|
| OP2K' | 0 | 0 |

(Note: OP2K' is previous OP2K content.)

The other class interrupts will have a similar type of operation with a resulting load state of the AKR, which is as follows:

IV.H.2. Device Interrupt:
1. Reset trace, disable EOS, and set supervisor states.
2. Set ISK = OP1K = OP2K = 0
3. Put the address of a device data block into Register 1.
4. Put in Register 7 the interrupt ID word received from the interrupting I/O device.

The resulting AKR load state is:

| OP1K | OP2K | ISK |
|---|---|---|
| 0 | 0 | 0 |

IV.H.3. Machine Check, and Program Check/Soft Exception Interrupts
1. Reset trace, disable summary mask, disable EOS, and set supervisor states. Store LSB in key 0 address space.
2. Set ISK = OPK2 = 0
3. Store in OP1K the LSKA.
4. Store content of SAR in Register 7 (except for trace).

The resulting AKR load state is:

| OP1K | OP2K | ISK |
|---|---|---|
| LKSA | 0 | 0 |

(Note: LKSA is last key in register 408 in FIG. 4 when an interrupt occurred.)

IV.H.4. Console Interrupt/Power Thermal Warning Interrupt

1. Reset trace, disable summary mask, disable EOS, and set supervisor states.
2. Store LSB using Address key 0.
3. Set ISK = OP1K = OP2K = 0.

The resulting AKR load state is:

| OP1K | OP2K | ISK |
|---|---|---|
| 0 | 0 | 0 |

IV.H.5. Trace Interrupts
1. Reset trace, disable summary mask, disable EOS, and set supervisor states. Store LSB in key 0 address space.
2. Transfer ISK into OP1K.
3. Set OP2K = ISK = 0.

The resulting AKR load state is:

| OP1K | OP2K | ISK |
|---|---|---|
| ISK' | 0 | 0 |

(Note: ISK' is the ISK at time of interrupt.)

V. Non-Translation Storage Protection Circuits

The non-translation storage (NTS) protection control circuits shown in FIG. 11 are used when the relocation translator shown in FIGS. 9A and 9B is either not enabled or is not installed in the system. This invention provides an upward compatibility relationship between the translator address-key protect feature and the non-translatable storage protect feature. That is, programs and data used in a system operating with the NTS protect feature can be used without change on a machine having the relocation translator. This migration relationship between the two types of protection circuits is very important to system users who wish to begin with a relatively small storage system that is inexpensive and later grow to a larger system having an extended memory.

When the relocation translator is enabled, the NTS protection is enabled, the relocation translator is disabled. The state of the NTS protection feature is controlled by the enable/disable instructions shown in FIG. 13A.

The NTS protection circuits provide against undesired access of a main memory location by either a processor or an I/O operation using an untranslated address. With the NTS protect feature, the main memory is divided into 2K blocks of 2048 bytes. Each block of main memory is provided with a storage key register in a stack 401 in FIG. 11. Each register is associated with a predetermined block in the inner storage unit selected by the high-order five bits in a 16 bit physical address, which is the program apparent address directly generated by a program executing on a system. With the NTS protect feature, the program apparent address is the physical address; but when the translator is enabled, the program apparent address is part of an input logical address. Each register has at least 3 bit positions for an assigned storage key and a read only bit R, and it nay also have a valid bit V (not shown). The three bit storage key have bit positions 0, 1 and 2 which may be loaded by conventional load storage key instructions, e.g. like in the IBM System/360 system.

A comparator part of the NTS protect circuit operation is similar to the storage key protect circuit operation performed on conventional systems such as an IBM S/360 or S/370. However, the other cooperative parts of the NTS protect feature provide an inventive arrangement in this specification including its combination with the unique AAK select circuits 333 in FIG. 3D.

The comparator operation uses the high-order bits 0-4 in the 16 bit physical address to index the stack register associated with the inner storage block. The storage key in the indexed register is accessed. The AAK is then compared with the stack selected storage key in the compare equal circuit 402 in FIG. 11. If they compare equal, the access is allowed, provided the NTS protect feature is enabled and the access is a fetch or it is write and read only bit which is off. Accordingly, the NTS protect feature provides access type protection, e.g. it can provide separate protection for OP1K, OP2K, ISK address spaces in a non-translated environment.

Further unique features of the NTS protect circuits are in its control of shared storage areas, defined by a particular key value, and of accesses by the I/O subchannels. The user has access to the particular key areas defined for the user in the AKR in the processor, and all users may use key=7 in any register section of the AKR to define a common access area shared by the users. Circuit 405 controls the accesses the the shared areas.

The unique I/O operation access control in the NTS protect mode is provided by circuits 404 and 405, which permit any I/O cycle steal access request to be made in the key area defined in his AKR, or in the common storage area having key=7. without any I/O cycle steal access being inhibited by the read only bit in the accessed storage key register. Thus, an I/O write access is permitted regardless of the setting of the read-only bit in the selected register in stack 401.

If the processor is in supervisory state, i.e. bit 8 is set in the LSR in FIG. 4, the storage key protect controls are bypassed and all accesses are allowed into any block in main store.

In summary, the address space control provided by the AKR is used whether the NTS protect feature is enabled or whether the optional translator feature is used. Accordingly the AAK will be a CS key or a key in the AKR selected by execution of each processor instruction as determined by the type of operand being fetched or by an instruction is being fetched.

When the NTS protect feature is enabled, one or more of the following conditions must be true to authorize an attempt of access storage.

1. The machine is in supervisory state.
2. The storage key of the address block is 7.

If attempting to write storage, the read read only bit must be off (e.g. zero).

3. The storage key of the address block must equal the AAK. If attempting to write storage, the read only bit must be off.

If none of the above conditions (1), (2) or (3) is obtained, the output of inverter 407 in FIG. 11 provides a storage access suppression signal which generates a program check (PCK) interrupt that will set the corresponding bit in the processor state word register.

Therefore, the supervisory state has free access to all of main memory. An access to a storage area having a storage protect key of 7 is permitted regardless of the AAK value or the values in the AKR when the system is not in supervisory state, providing that the read only bit for the accessed block is not violated.

It is therefore apparent that within any single addressable area defined by an address key, some blocks of that area can be maintained in a read only state and other blocks of the area made writeable by setting or not setting the read only bit for the blocks in the addressable area. The read only bit can be set by the supervisory program which loads the stack registers.

During initial program load (IPL), the NTS protect feature and translator feature are both disabled so that the main memory can be written into at any location during the initial loading process. Upon the successful completion of IPL, either protect feature can be enabled, and the machine enters the supervisor state with all address keys in the AKR being set to zero.

In addition to the common AAK features between the NTS protect feature and translator feature, they have a number of features which are dissimilar such as:

1. With the NTS protect feature, the supervisory state will allow access to all of main memory irrespective of the storage keys. In a translator system, the supervisory state may only access the memory area defined by the AAK.
2. The total storage defined by the address keys on a NTS protect system is less than or equal to 64K bytes. The total static storage definable by the address keys on a translator system may be up to 512K bytes at any instant of time.
3. On a translator system, the address space defined by the address keys starts at logical address zero. On an NTS protect system, the address space defined by the address keys will start on various 2K byte boundaries, but the address key still provides access-type control.
4. The instructions used to load and store the storage key registers in the processor are different from the instructions used to load and store segmentation registers in the translator.
5. An I/O device on a translator enabled system can not receive protect checks; however, an I/O device on an NTS protect enabled system can receive a protect check for an access at an address which is not in the CS key defined area or key=7 area.
6. Due to the address mapping feature flexibility on the translator, certain mappings from logical to physical address space are difficult to emulate in the NTS protect mode, e.g. a common area exclusive to only two address keys.

VI. Alternate Translate Protect Mode

FIG. 14 illustrates control circuits for an alternate translate protect mode (APM) usable in a data processing system. The APM mode is alternative to the previously described translate mode using the plural sectioned AKR in FIG. 1D. The alternate mode does not provide the storage-access-type controlled processor addressability obtained with FIG. 1D, but it permits separate addressability for I/O storage accesses. The alternate mode does provide AAK addressability discrimination for the processor among its different programs and data having different user address keys, while also permitting user interaction with supervisory program operations, whenever necessary, without having to change the content of a user key register (UKR) 460.

In FIG. 14 only a single address key is loadable into the processor's UKR register 460, so that all storage accesses for executing user program(s) and data must be done within the single addressability defined by the user key value in UKR 460, which is a non-zero key value, since the zero key value is reserved for the memory area containing the system supervisor programs and data. I/O accesses are controlled by the CS key looadable by a subchannel into a CS key register 465.

The APM mode is controlled for a processor by a bit position A in the level status register (LSR) 470. When the supervisor state is on, bit S is set; and when the APM mode is on, bit A is set.

When both bits S and A are set, a first type of processor operation is provided, in which interaction is enabled for a supervisor program (contained in the key=0 area) with the current user key area (identified by the current user key in UKR 460). That is, the supervisor program is permited to execute from the key=0 area and access operands in the user address key area. However the supervisor can not access other addressabilities in main memory defined by other key values. This supervisor interaction with restricted addressability, for example, enables its interrupt handling programs to access a currently interrupted user program and data without the danger of the supervisor program disturbing the integrity of non-pertinent areas of main memory if something goes wrong in the supervisor operation. Also any executing user program is never permitted to access the supervisor memory area, because any user program only has addressability to the user's own area, identified by the user's key.

A second type of processor operation occurs when the supervisor bit S is on and the APM bit A is off. Then the supervisory program can operate from the key=0 area without disturbing the current user key in UKR 460. In this case, all I-fetches and operand accesses can only be made in the key=0 area, with no supervisor interaction permitted with any user area. That is, the supervisor then has no access to the user key area identified by the current content of UKR 460, or to any other key area. This special type of system operation eliminates the need to load and reload key=0 into UKR 460.

A third type of processor operation is provided when the supervisor bit S is off, regardless of the state of APM bit A. In this case, all instruction fetches and operand accesses can only be in the user key area. That is, no accesses are permitted into the key =0 area of main memory.

The APM mode is controlled in the processor by the hardware shown in FIG. 14. An AND gate 462 is enabled by setting on both the S and A bits in LSR 470 to provide the first type of processor operation defined above. Then gate 462 is actuated by each I-fetch request from the processor in FIG. 4 to provide an output through OR circuit 466 and an inverter 467 to disable AND circuit 461 during the instruction fetch operation. While AND circuit 461 is disabled, it provides an all-zeros output signal representing key−0 to the AAK bus. Thus, the I-fetch is only allowed in the supervisor key=0 area.

When there is no I-fetch request, such as between I-fetch requests, AND gate 462 is not actuated and inverter 467 provides an enabling signal to AND gate 461 to output the user address key in UKR 460 to the AAK bus, so that a fetched executing supervisory program instruction can access operands in the user key area being addressed by the key in UKR 460.

If the APM bit A is off while the supervisor bit S is on in the LSR, AND gate 464 is continuously enabled to continuously disable AND gate 461 via inverter 467, so that gate 461 continuously outputs key=0 to the AAK bus. This provides the second type of processor operation described above, in which only the supervisor program can operate with all operand and I-fetches restricted to the key=0 area, regardless of the user key in AKR 460.

If the S bit is off in LSR 470, AND gates 462 and 464 are continuously disabled so that inverter 467 provides a continuously enabling output to AND gate 461, which then continuously passes the user address key to the AAK bus. This provides the third type of processor operation defined above, and causes all storage accesses for both the processor and I/O to be in the main memory area address by the user key in UKR 460. The supervisor cannot operate, until bit S is set on.

We claim:

1. A system for protecting the contents of main storage of a processor using a plurality of storage protect keys operated by the processor having an equateoperand spaces (EOS) control feature, comprising
   storage access request means in the processor for signalling storage access requests sensed in the processor while fetching and executing instructions,
   means for generating different storage access type signals for different types of storage accesses signalled by the access request means including an instruction access type signal and at least one operand access type signal,
   a plurality of key register sections, each key register section corresponding to an access type gated from the generating means, a key provided in each section being associated with the access type signal connected to the outgate of the respective section,
   key selection means for selecting the outgates of the respective key register sections under control of the respective storage access type signals provided by the generating means,
   an equate-operand-spaces (EOS) latch which is set and reset by execution of predetermined instructions by the processor,
   first means for disabling one key register outgate in response to the setting of the EOS latch, and
   second means for enabling another outgate in response to activation of the storage access type signal connected to the one outgate when the EOS latch is set,
   whereby when the EOS latch is set, the another outgate selects the key contained in another key register section instead of the key in the key register section associated with the one outgate; but when the EOS latch is reset, the one outgate being enabled to select the key in the associated key section.

2. A protected storage system having the EOS control feature as defined in claim 1, further comprising
   priority circuit means connected to the storage access type signals for signalling priority among the storage access type signals simultaneously being outputted by the request means by activating only one storage access type signal input to the key selection circuit means at any one time.

3. A protected storage system having the EOS control feature as defined in claim 8, further comprising I/O subchannels connected to the processor, each I/O subchannel having a cycle steal (CS) key register section for storing an assigned CS key, each I/O subchannel outputting a CS register section when it outputs a CS storage access request signal, the key selection circuit means also having inputs receiving the CS key register output, the priority circuit means providing highest output priority to the CS key register output when a CS storage request signal is received.

4. A protected storage system having the EOS control feature as defined in claim 1, in which the processor generates an instruction fetch signal as one of the instruction access type signals when the processor requires a next instruction, an instruction storage key (ISK) register section being one of the plurality of key register sections for storing an assigned key in the ISK register section, and the priority circuit means provides second highest output priority to the ISK key when an instruction fetch signal is received.

5. A protected storage system having the EOS control feature as defined in claim 1, in which the key register sections are respectively associated with an instruction access type, a first operand access type, and a second operand access type, the outgates being provided for the respective register sections, the generating means generates an instruction access type signal, a first operand access type signal to indicate a fetch-only access type of source operand, and a second operand access type signal to indicate a fetch or store type of source or sink operand, whereby the key for the second operand access type signal is outputted by the key selection means while the output EOS latch is set whenever the first or second operand access type signal is provided by the generating means.

6. A protected storage system having the EOS control feature as defined in claim 1, in which the key selection means receives plural operand access type signals for all but one of the plural operand access types from the storage access request means, default circuit means included in the key selection means for selecting a default key register section corresponding to one of the plural operand access type signals when no storage access signal line is actuated while a storage request is being generated by the request means.

* * * * *